(12) United States Patent
Shimokawa et al.

(10) Patent No.: US 11,070,112 B2
(45) Date of Patent: Jul. 20, 2021

(54) SENSOR MAGNET, ROTOR, ELECTRIC MOTOR, AND AIR CONDITIONER

(71) Applicant: Mitsubishi Electric Corporation, Tokyo (JP)

(72) Inventors: Takaya Shimokawa, Tokyo (JP); Kazuhiko Baba, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 401 days.

(21) Appl. No.: 16/070,806

(22) PCT Filed: Apr. 1, 2016

(86) PCT No.: PCT/JP2016/060918
§ 371 (c)(1),
(2) Date: Jul. 18, 2018

(87) PCT Pub. No.: WO2017/168751
PCT Pub. Date: Oct. 5, 2017

(65) Prior Publication Data
US 2019/0027980 A1 Jan. 24, 2019

(51) Int. Cl.
*H02K 1/27* (2006.01)
*H02K 11/215* (2016.01)
(Continued)

(52) U.S. Cl.
CPC ............. *H02K 11/215* (2016.01); *H02K 1/27* (2013.01); *H02K 11/21* (2016.01); *H02K 15/03* (2013.01); *H02K 21/14* (2013.01); *H02K 29/08* (2013.01)

(58) Field of Classification Search
CPC ........ H02K 1/27; H02K 11/21; H02K 11/215; H02K 15/03; H02K 21/14; H02K 29/08; H02K 1/274; H02K 2213/03; F24F 11/89
See application file for complete search history.

(56) References Cited

U.S. PATENT DOCUMENTS 3,867,656 A * 2/1975 Mitsui .................... H02K 29/08
310/68 R
4,334,166 A * 6/1982 Miyahara ................ H02K 29/08
310/268

(Continued)

FOREIGN PATENT DOCUMENTS

JP       02-280642 A    11/1990
JP     2000-333429 A    11/2000

(Continued)

OTHER PUBLICATIONS

International Search Report ("ISR") dated Jun. 28, 2016 issued in corresponding international patent application No. PCT/JP2016/060918.

(Continued)

*Primary Examiner* — Mohamad A Musleh
(74) *Attorney, Agent, or Firm* — Posz Law Group, PLC

(57) ABSTRACT

A sensor magnet includes: a first magnetic-pole part including a magnetic pole of first polarity; a second magnetic-pole part including a magnetic pole of second polarity; and an inter-pole part formed between the first magnetic-pole part and the second magnetic-pole part. A width of the inter-pole part is larger than both of a width of the first magnetic-pole part and a width of the second magnetic-pole part.

14 Claims, 19 Drawing Sheets

(51) Int. Cl.
  *H02K 21/14* (2006.01)
  *H02K 29/08* (2006.01)
  *H02K 11/21* (2016.01)
  *H02K 15/03* (2006.01)

(56) References Cited

U.S. PATENT DOCUMENTS

| | | | |
|---|---|---|---|
| 9,735,658 B2* | 8/2017 | Woo | H02K 11/215 |
| 2004/0164733 A1 | 8/2004 | Fukaya et al. | |
| 2010/0289442 A1 | 11/2010 | Hatano et al. | |
| 2014/0167572 A1* | 6/2014 | Woo | H02K 11/215 |
| | | | 310/68 B |

FOREIGN PATENT DOCUMENTS

| | | | |
|---|---|---|---|
| JP | 2002-078309 A | 3/2002 |
| JP | 2002-315279 A | 10/2002 |
| JP | 2004-015911 A | 1/2004 |
| JP | 2004-023905 A | 1/2004 |
| JP | 2004-271495 A | 9/2004 |
| JP | 2005-168116 A | 6/2005 |
| JP | 2005-348525 A | 12/2005 |
| JP | 3748037 B | 12/2005 |
| JP | 2012-251843 A | 12/2012 |
| JP | 2013-201858 A | 10/2013 |
| JP | 2015-065789 A | 4/2015 |
| KR | 20020094625 A | 12/2002 |
| WO | 2009/125527 A1 | 10/2009 |

OTHER PUBLICATIONS

Office Action dated Feb. 5, 2020 issued in corresponding KR patent application No. 10-2018-7024952 (and English translation).
Office Action dated Aug. 18, 2020 in connection with counterpart CN patent application No. 201680083415.7 (and a machine English translation).
Office Action dated Dec. 25, 2019 issued in corresponding CN patent application No. 201680083415.7 (and English translation).
Office Action dated Sep. 6, 2019 issued in corresponding KR patent application No. 10-2018-7024952 (and English translation).
Office Action dated May 21, 2019 issued in corresponding JP patent application No. 2018-508335 (and English translation).
Office Action dated Oct. 8, 2019 issued in corresponding JP patent application No. 2018-508335 (and English translation).
Office Action dated Mar. 3, 2021 in connection with counterpart CN patent application No. 201680083415.7 (and a machine English translation).

* cited by examiner

SENSOR MAGNET, ROTOR, ELECTRIC MOTOR, AND AIR CONDITIONER

CROSS REFERENCE TO RELATED APPLICATION

This application is a U.S. national stage application of International Application No. PCT/JP2016/060918, filed on Apr. 1, 2016, the contents of which are incorporated herein by reference.

TECHNICAL FIELD

The present invention relates to a sensor magnet, a rotor, an electric motor, and an air conditioner.

BACKGROUND

In general, in a motor (e.g., a brushless motor) including a rotor, an iron core, a stator, a bearing, and so forth, applying voltage to wires wound around the iron core, and accordingly an operation of the motor (rotation of the rotor) is controlled. For example, a motor is proposed; in the motor, to optimally control rotation of a rotor, a position detecting magnetic-pole part is disposed on an end face of a main magnetic-pole part, and a magnetic sensor for detecting positions of magnetic poles (a north pole and a south pole) of the position detecting magnetic-pole part that rotates with rotation of the main magnetic-pole part is mounted (see, for example, Patent Reference 1). In this motor, the magnetic sensor detects the magnetic pole positions of the position detecting magnetic-pole part so that wires are energized at an optimum timing for a rotational position (phase) of the main magnetic-pole part and rotation of the rotor is controlled.

Patent Literature

Patent Reference 1: Japanese Patent Application Publication No. 2002-78309

SUMMARY

The sensor magnet whose radial width is uniform along the circumferential direction, however, shows a gradual change of a magnetic field near an inter-pole, and thus, an individual difference in detection accuracy (output characteristics) sometimes occurs depending on sensitivity of magnetic sensor to be used or the like.

It is therefore an object of the present invention to provide a sensor magnet, a rotor, an electric motor, and an air conditioner in which an individual difference of detection sensitivity among magnetic sensors can be reduced.

A sensor magnet according to the present invention includes: a first magnetic-pole part including a magnetic pole of first polarity; a second magnetic-pole part including a magnetic pole of second polarity; and an inter-pole part formed between the first magnetic-pole part and the second magnetic-pole part, wherein the first magnetic-pole part, the inter-pole part, and the second magnetic-pole part are arranged in a circumferential direction around an axis line, and a width of the inter-pole part in a radial direction is larger than both of a width of the first magnetic-pole part in a radial direction and a width of the second magnetic-pole part in a radial direction and more than 1.5 times as large as the width of the first magnetic-pole part.

A rotor according to the present invention includes: a rotating shaft; a rotor yoke fixed to the rotating shaft; and a sensor magnet, wherein the sensor magnet includes a first magnetic-pole part including a magnetic pole of first polarity, a second magnetic-pole part including a magnetic pole of second polarity, and an inter-pole part formed between the first magnetic-pole part and the second magnetic-pole part, the first magnetic-pole part, the inter-pole part, and the second magnetic-pole part are arranged in a circumferential direction around an axis line, and a width of the inter-pole part in a radial direction is larger than both of a width of the first magnetic-pole part in a radial direction and a width of the second magnetic-pole part in a radial direction and more than 1.5 times as large as the width of the first magnetic-pole part.

An electric motor according to the present invention includes: a stator; a rotor disposed inside the stator; and a magnetic sensor that detects a rotational position of the rotor, wherein the rotor includes a rotating shaft, a rotor yoke fixed to the rotating shaft, and a sensor magnet disposed at a position facing the magnetic sensor, the sensor magnet includes a first magnetic-pole part including a magnetic pole of first polarity, a second magnetic-pole part including a magnetic pole of second polarity, and an inter-pole part formed between the first magnetic-pole part and the second magnetic-pole part, the first magnetic-pole part, the inter-pole part, and the second magnetic-pole part are arranged in a circumferential direction around an axis line, and a width of the inter-pole part in a radial direction is larger than both of a width of the first magnetic-pole part in a radial direction and a width of the second magnetic-pole part in a radial direction and more than 1.5 times as large as the width of the first magnetic-pole part.

An air conditioner according to the present invention includes: an outdoor unit; an indoor unit connected to the outdoor unit; and an electric motor mounted on at least one of the outdoor unit and the indoor unit, wherein the electric motor includes a stator, a rotor disposed inside the stator, and a magnetic sensor that detects a rotational position of the rotor, the rotor includes a rotating shaft, a rotor yoke fixed to the rotating shaft, and a sensor magnet disposed at a position facing the magnetic sensor, the sensor magnet includes a first magnetic-pole part including a magnetic pole of first polarity, a second magnetic-pole part including a magnetic pole of second polarity, and an inter-pole part formed between the first magnetic-pole part and the second magnetic-pole part, the first magnetic-pole part, the inter-pole part, and the second magnetic-pole part are arranged in a circumferential direction around an axis line, and a width of the inter-pole part in a radial direction is larger than both of a width of the first magnetic-pole part in a radial direction and a width of the second magnetic-pole part in a radial direction and more than 1.5 times as large as the width of the first magnetic-pole part.

According to the present invention, an individual difference in detection sensitivity among magnetic sensors to be used together with a sensor magnet can be reduced.

DETAILED DESCRIPTION

An embodiment will be described with reference to the drawings. In an xyz orthogonal coordinate system shown in each drawing, an x-axis direction refers to a direction parallel to an axis line A0 of a rotating shaft 21 of a motor 1 (electric motor) (hereinafter referred to as a "direction of the axis line" or an "axial direction"), a y-axis direction refers to a direction orthogonal to the x-axis direction, and a z-axis direction refers to a direction orthogonal to both the x-axis direction and the y-axis direction.

Figure 1:
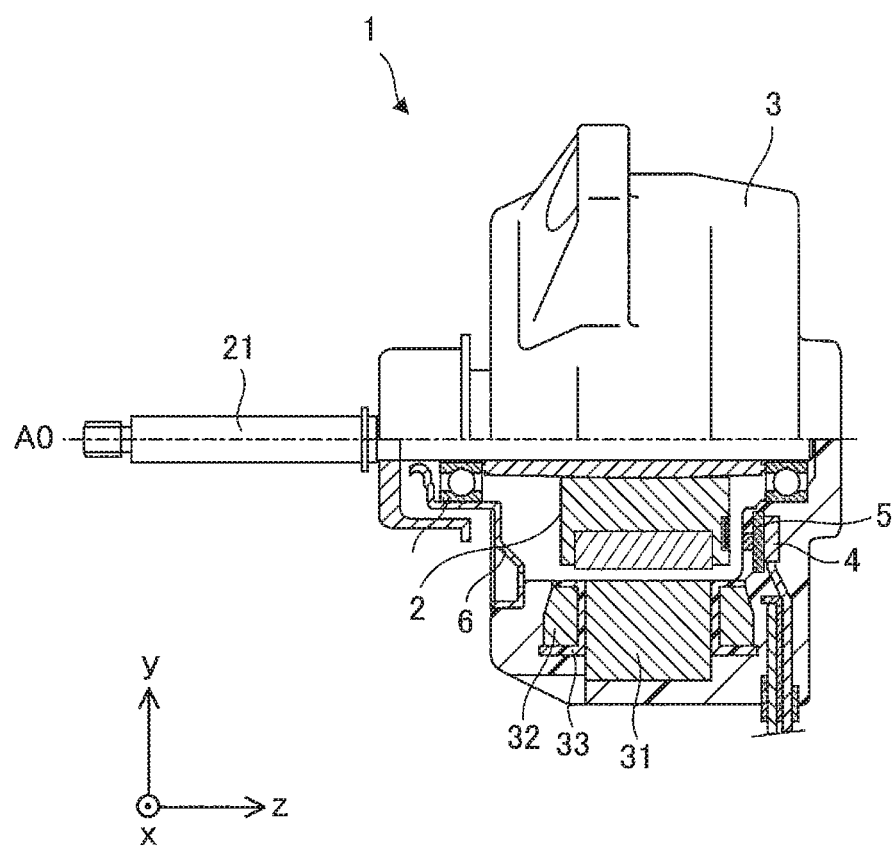
FIG. 1 is a partial cross-sectional view schematically illustrating a structure of a motor including a sensor magnet according to a first embodiment of the present invention.

FIG. 1 is a partial cross-sectional view schematically illustrating a structure of the motor 1 including a sensor magnet 25 according to a first embodiment of the present invention.

Figure 2:
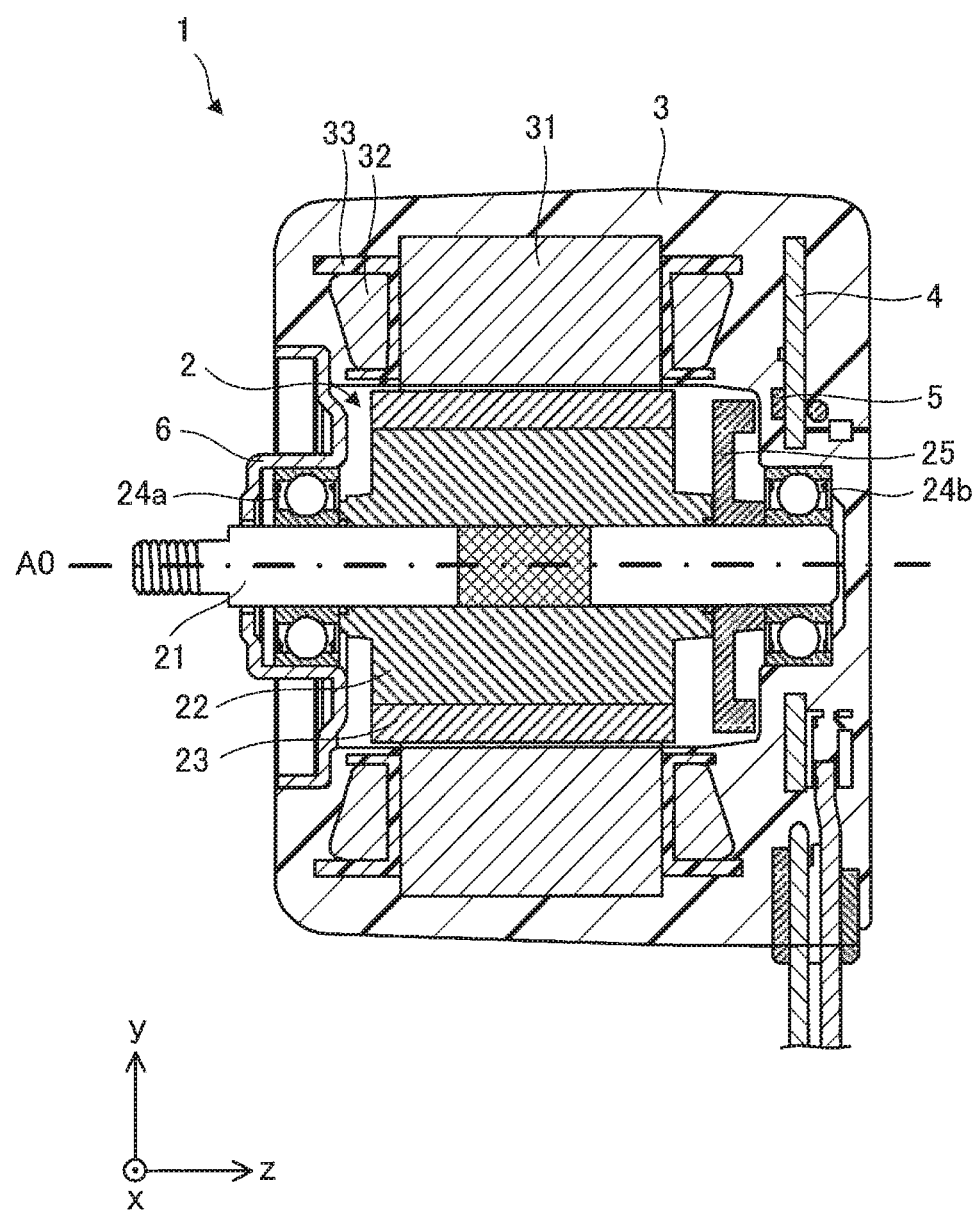
FIG. 2 is a cross-sectional view schematically illustrating an internal structure of the motor.

FIG. 2 is a cross-sectional view schematically illustrating an internal structure of the motor 1.

The motor 1 includes a rotor 2, a stator 3, a circuit board 4, a magnetic sensor 5, and a bracket 6. The motor 1 is, for example, a permanent magnet synchronous motor.

Figure 3:
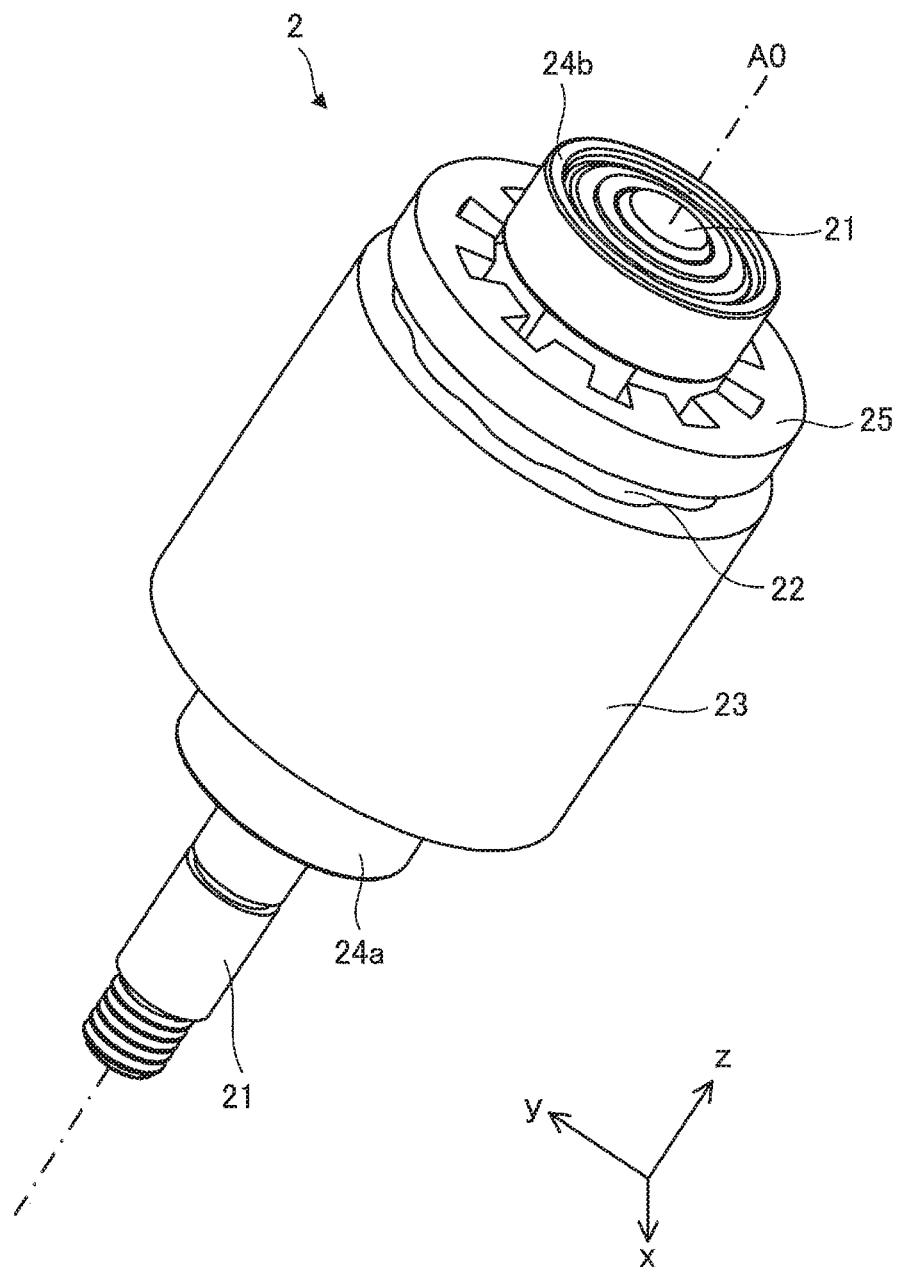
FIG. 3 is a perspective view schematically illustrating a structure of a rotor.

FIG. 3 is a perspective view schematically illustrating a structure of the rotor 2.

The rotor 2 includes the rotating shaft 21, a back yoke 22 as a rotor yoke, a main magnet 23, a first bearing (load-side bearing) 24a, a second bearing (counter-load-side bearing) 24b, and a sensor magnet 25. The rotor 2 is disposed inside the stator 3.

The rotating shaft 21 is rotatably supported by the first bearing 24a and the second bearing 24b using the axis line A0 as a rotation center.

The back yoke 22 is fixed to the rotating shaft 21. The back yoke 22 is composed of, for example, ferrite or an electrical steel sheet.

The main magnet 23 is disposed at the outer periphery of the back yoke 22. The main magnet 23 is composed of, for example, a ferrite magnet or a rare-earth magnet.

The first bearing 24a is fixed to the inside of the stator 3 at the load side of the motor 1. The second bearing 24b is fixed to the inside of the stator 3 at the counter-load side of the motor 1. The first bearing 24a and the second bearing 24b rotatably support the rotating shaft 21.

The stator 3 includes a stator iron core 31 composed of laminated electrical steel sheets, a coil 32 formed by winding a conducting wire around a tooth of the stator iron core 31, and an insulator 33 for insulating the stator iron core 31 and the coil 32 from each other. The stator 3 is made of, for example, a thermoplastic resin (molding resin) such as unsaturated polyester. The rotor 2 is inserted in the stator 3 with a gap interposed therebetween. The bracket 6 is press-fitted into an opening portion at the load side of the stator 3, and the first bearing 24a is fixed to the opening portion.

The circuit board 4 is attached to the counter-load side of the stator 3, and the magnetic sensor 5 is mounted on the circuit board 4. The circuit board 4 is connected to a motor control circuit disposed outside or inside the motor 1 through a connector.

The magnetic sensor 5 detects a rotational position of the sensor magnet 25, thereby detecting a rotational position of the rotor 2. The magnetic sensor 5 is fixed to a position (detection position) in which a magnetic flux generated by the sensor magnet 25 flows. The motor control circuit controls a current flowing in a coil of the stator 3 by using a result of detection (e.g., a magnetic pole position) by the magnetic sensor 5, thereby controlling rotation of the rotor 2.

Based on a change of a magnetic field (magnetic field strength) flowing in the magnetic sensor 5, the magnetic sensor 5 detects positions (phases) of magnetic poles of the sensor magnet 25 (the back yoke 22 and the main magnet 23). In this embodiment, a time when the orientation of a magnetic field changes in the circumferential direction (rotation direction) of the sensor magnet 25 (a position near an inter-pole 253a described later) is a target of determination of the magnetic pole position (the inter-pole position). As described later, in the sensor magnet 25, since the north poles and the south poles are alternately arranged in the circumferential direction, the magnetic sensor 5 periodically detects a specific one of a plurality of inter-pole portions (i.e., at least one inter-pole portion), thereby making it possible to grasp the position of each magnetic pole (a rotation angle and a phase of the rotor 2) in the rotation direction.

Figure 4:
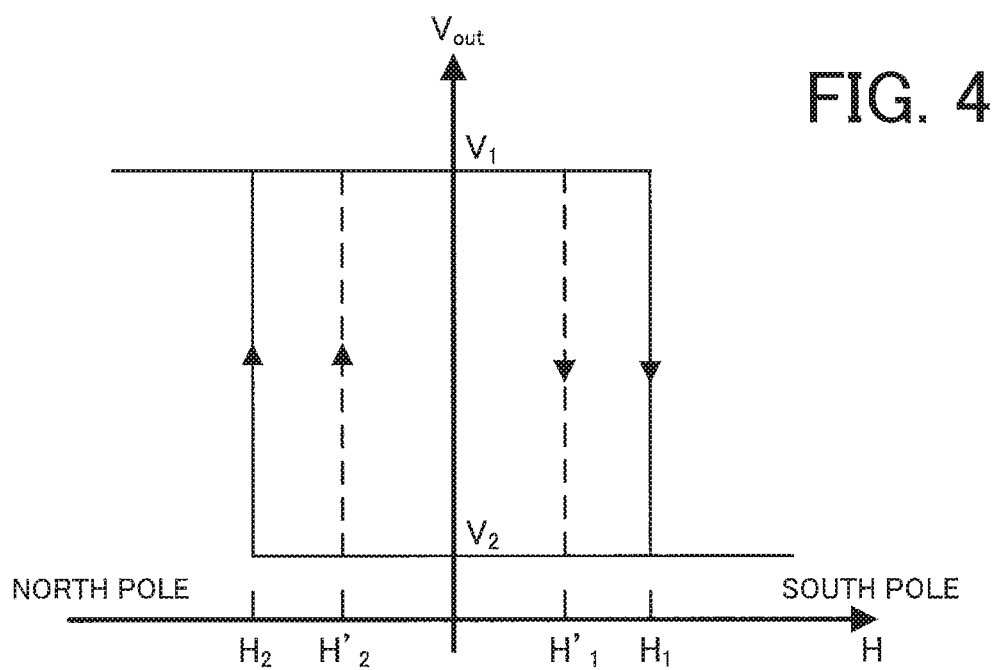
FIG. 4 is a diagram showing a relationship between strength of a magnetic field flowing into each of two magnetic sensors having different output characteristics and a magnetic sensor output value.

FIG. 4 is a diagram showing a relationship between magnetic field strength H (a Hall IC (integrated circuit) input magnetic field) flowing into each of two magnetic sensors (first and second magnetic sensors) having different output characteristics and a magnetic sensor output value $V_{out}$ (Hall IC output). The horizontal axis of the graph shown in FIG. 4 represents magnetic field strength H (input magnetic field) [N/Wb] flowing into the first and second magnetic sensors (magnetic field strength between the north pole and the south pole), and the vertical axis represents output signals (voltages) $V_{out}$[V] of the magnetic sensors.

As shown in FIG. 4, each of the first and second magnetic sensors outputs a binary value (signal) of a signal $V_1$ [V] or a signal $V_2$ [V]. As an example, an output characteristic of the first magnetic sensor will be described. For example, in a case where the first magnetic sensor detects a magnetic field (magnetic field strength) from the north pole toward the south pole of the sensor magnet 25, when the first magnetic sensor detects a magnetic field on the north pole side from the sensor magnet 25, the first magnetic sensor outputs the signal $V_1$ [V]. When the magnetic field flowing into the first magnetic sensor changes so that the first magnetic sensor detects a magnetic field on a south pole side (magnetic field strength $H_1$) from the sensor magnet 25, the first magnetic sensor outputs the signal $V_2$ [V]. Similarly, in a case where the first magnetic sensor detects a magnetic field (magnetic field strength) from the south pole side toward the north pole side of the sensor magnet 25, when the first magnetic sensor detects a magnetic field on the south pole side from the sensor magnet 25, the first magnetic sensor outputs the signal $V_2$ [V]. When the magnetic field flowing into the first magnetic sensor changes and the first magnetic sensor detects a magnetic field on the north pole side (magnetic field strength $H_2$) from the sensor magnet 25, the first magnetic sensor outputs the signal $V_1$ [V].

As another example, an output characteristic of the second magnetic sensor will be described. For example, in a case where the second magnetic sensor detects a magnetic field (magnetic field strength) from the north pole side toward the south pole side of the sensor magnet 25, when the second magnetic sensor detects a magnetic field on the north pole side from the sensor magnet 25, the second magnetic sensor outputs the signal $V_1$ [V]. When the magnetic field flowing into the second magnetic sensor changes so that the second magnetic sensor detects a magnetic field on the south pole side (magnetic field strength $H'_1$) from the sensor magnet 25, the second magnetic sensor outputs the signal $V_2$ [V]. Similarly, in a case where the second magnetic sensor detects a magnetic field (magnetic field strength) from the south pole side toward the north pole side of the sensor magnet 25, when the second magnetic sensor detects a magnetic field on the south pole side from the sensor magnet 25, the second magnetic sensor outputs the signal $V_2$ [V]. When the magnetic field flowing into the second magnetic sensor changes and the second magnetic sensor detects a magnetic field on the north pole side (magnetic field strength $H'_2$) from the sensor magnet 25, the second magnetic sensor outputs the signal $V_1$ [V].

Accordingly, as shown in FIG. 4, in some cases, the output signal of the magnetic sensor does not change instantly at the time (a position of an inter-pole portion) of switching of the orientation of the magnetic field flowing into the magnetic sensor. In addition, since the output characteristic varies among individual magnetic sensors (e.g., a difference between $H'_1$ and $H_1$) in some cases, a decrease in motor efficiency or noise during motor rotation due to an error in motor control is caused according to magnetic sensor 5 to be used in some cases.

Next, a structure of the sensor magnet 25 will be described in detail.

Figure 5:
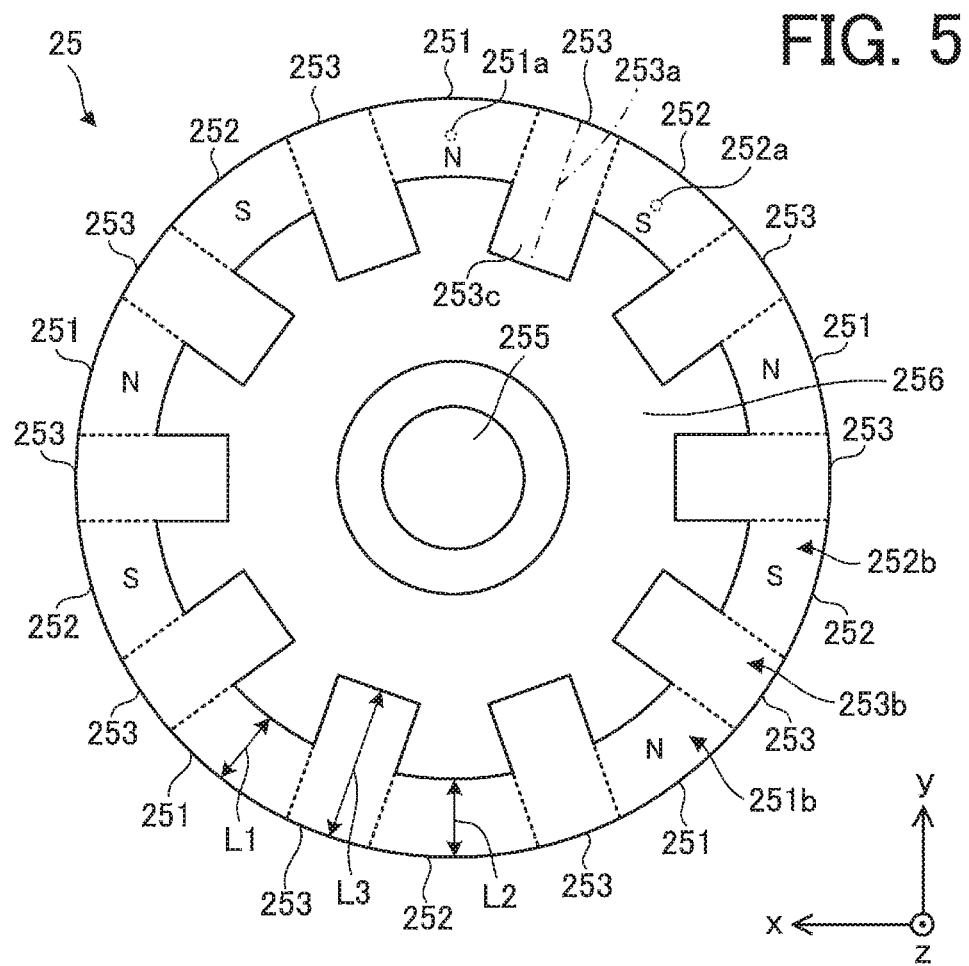
FIG. 5 is a plan view schematically illustrating a structure of a front surface of the sensor magnet.

FIG. 5 is a plan view schematically illustrating a structure of a front surface of the sensor magnet 25.

Figure 6:
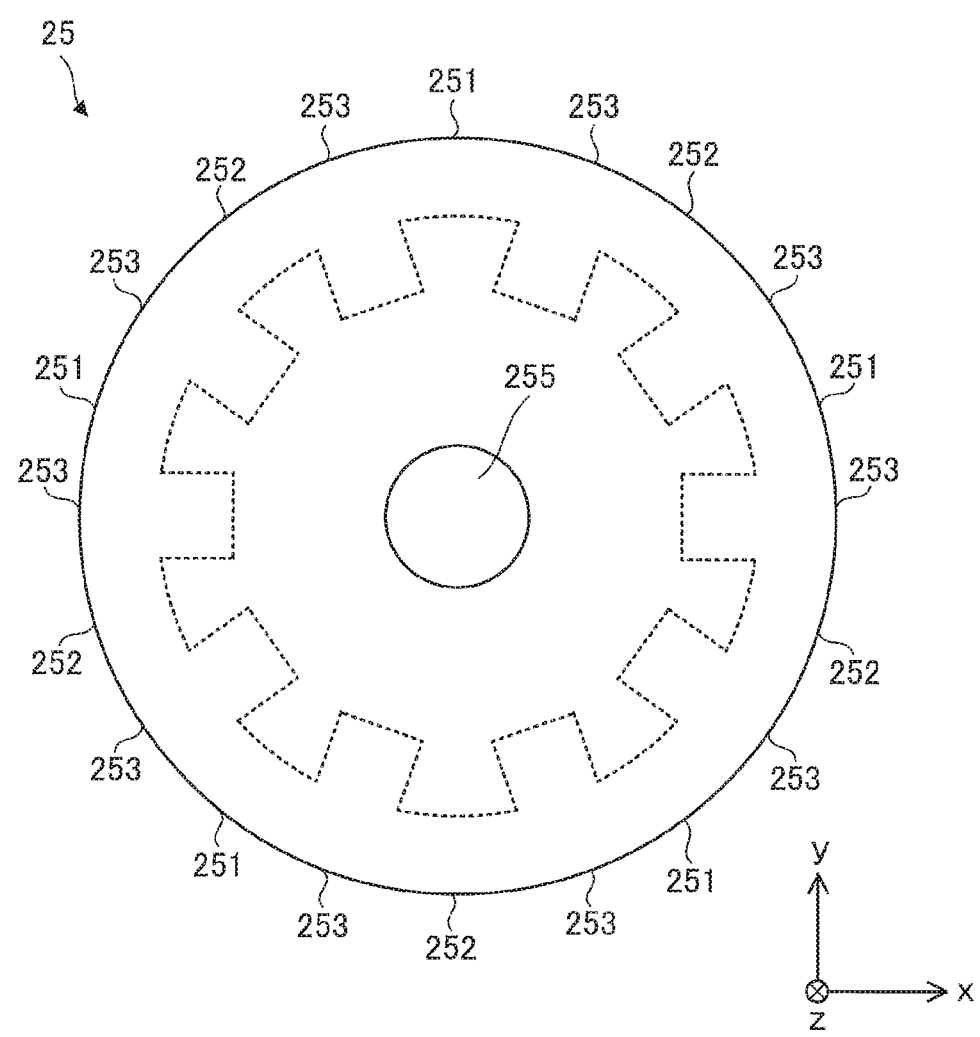
FIG. 6 is a bottom view schematically illustrating a structure of a back surface of the sensor magnet.

FIG. 6 is a bottom view schematically illustrating a structure of a back surface of the sensor magnet 25.

Figure 7:
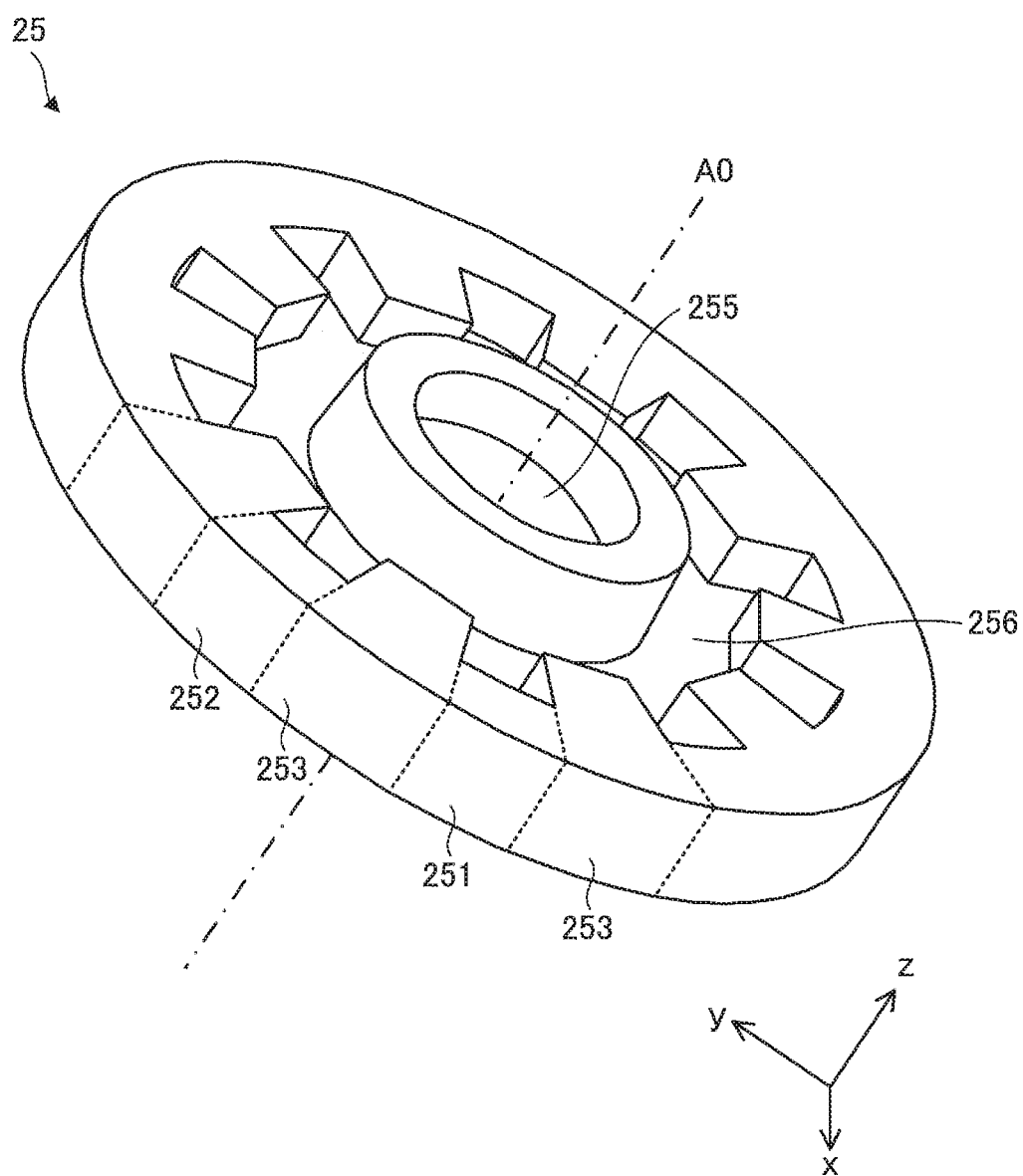
FIG. 7 is a perspective view schematically illustrating a structure of the sensor magnet.

FIG. 7 is a perspective view schematically illustrating the structure of the sensor magnet 25. Broken lines shown in FIGS. 5 and 7 represent boundaries among first magnetic-pole parts 251, inter-pole parts 253, and second magnetic-pole parts 252.

The sensor magnet 25 is fixed to the counter-load side of the rotor 2 at a position facing the magnetic sensor 5. The sensor magnet 25 is magnetized in such a manner that a magnetic field is oriented in a direction parallel to the axis line A0, and a magnetic flux generated by the sensor magnet 25 flows into the magnetic sensor 5. The main magnet 23 is disposed to have a magnetic field oriented in a radial direction of the main magnet 23 (a radial direction of the sensor magnet 25), and thus, this magnetic field orientation is different from the magnetic field orientation of the sensor magnet 25. The number of poles of the sensor magnet 25 is equal to the number of poles of the main magnet 23. The sensor magnet 25 and the main magnet 23 are positioned relative to each other in such a manner that the positions of magnetic poles of the sensor magnet 25 coincide with those of the main magnet 23 in the circumferential direction.

The sensor magnet 25 includes the first magnetic-pole parts 251, the second magnetic-pole parts 252, and the inter-pole parts 253 each of which is a portion disposed between magnetic poles. The first magnetic-pole parts 251, the inter-pole parts 253, and the second magnetic-pole parts 252 are arranged in the circumferential direction around the axis line of the sensor magnet 25. Specifically, the first magnetic-pole parts 251 and the second magnetic-pole parts 252 are alternately arranged with the inter-pole parts 253 interposed between the first magnetic-pole parts 251 and the second magnetic-pole parts 252 in the circumferential direction of the sensor magnet 25. Thus, in this embodiment, the sensor magnet 25 includes the plurality of first magnetic-pole parts 251, the plurality of second magnetic-pole parts 252, and the plurality of inter-pole parts 253. In other words, the plurality of first magnetic-pole parts 251, the plurality of second magnetic-pole parts 252, and the plurality of inter-pole parts 253 are integrated together to form an annular shape (a ring shape). The individual first magnetic-pole parts 251 have the same structure. The individual second magnetic-pole parts 252 have the same structure. The individual inter-pole parts 253 have the same structure. Arrangement relationships among the first magnetic-pole parts 251, the inter-pole parts 253, and the second magnetic-pole parts 252 are preferably identical in the circumferential direction around the axis line A0.

In this embodiment, the sensor magnet 25 has a disc shape whose rotation center is the axis line A0. For example, the outer diameter of the sensor magnet 25 in the first magnetic-pole parts 251 (the second magnetic-pole parts 252) is preferably equal to the outer diameter of the sensor magnet 25 in the inter-pole parts 253. In other words, the outer periphery in the first magnetic-pole parts 251 (the second magnetic-pole parts 252) and the outer periphery in the inter-pole parts 253 are preferably located on the same circle. The shape of the sensor magnet 25 is not limited to the disc shape.

A through hole 255 is formed on the sensor magnet 25. The rotating shaft 21 is inserted in the through hole 255. That is, the sensor magnet 25 is fixed to an end on the counter-load side of the back yoke 22 with the rotating shaft 21 inserted in the through hole 255. A depression 256 is formed inside the sensor magnet 25.

Each of the first magnetic-pole parts 251 has a magnetic pole 251a (north pole) of first polarity (north polarity) and a detection target surface 251b (a first detection target surface). The detection target surface 251b is an end face of the first magnetic-pole part 251 in the axial direction. In other words, the detection target surface 251b is a portion of the first magnetic-pole part 251 facing the magnetic sensor 5. A width L1 is a width of the first magnetic-pole part 251 in the radial direction of the sensor magnet 25 in the first magnetic-pole part 251. For example, the width L1 is a width of the first magnetic-pole part 251 in the radial direction of the sensor magnet 25 in the detection target surface 251b including the magnetic pole 251a.

Each of the second magnetic-pole parts 252 includes a magnetic pole 252a (south pole) of second polarity (south polarity) and a detection target surface 252b (a second detection target surface). The detection target surface 252b is an end face of the second magnetic-pole part 252 in the axial direction. In other words, the detection target surface 252b is a portion of the second magnetic-pole part 252 facing the magnetic sensor 5. A width L2 is a width of the second magnetic-pole part 252 in the radial direction of the sensor magnet 25 in the second magnetic-pole part 252. For example, the width L2 is a width of the second magnetic-pole part 252 in the radial direction of the sensor magnet 25 in the detection target surface 252b including the magnetic pole 252a. The sensor magnet 25 is magnetized so that the magnetic poles 251a and 252a are located on the same circle.

In this application, each of the magnetic poles 251a and 252a is also referred to as a pole center.

Each of the inter-pole parts 253 is formed between one of the first magnetic-pole parts 251 and one of the second magnetic-pole parts 252. Each of the inter-pole parts 253 includes an inter-pole 253a, a detection target surface 253b (a third detection target surface), and a projecting part 253c (a first projecting part). The inter-pole 253a is a boundary between the north polarity and the south polarity (a location at which the orientation of a magnetic field changes). The detection target surface 253b is an end face of the inter-pole part 253 in the axial direction. In other words, the detection target surface 253b is a portion of the inter-pole part 253 facing the magnetic sensor 5. A width L3 is a width of the inter-pole part 253 in the radial direction of the sensor magnet 25 in the inter-pole part 253. For example, the width L3 is a width of the inter-pole parts 253 in the radial direction of the sensor magnet 25 on the detection target surface 253b including the inter-pole 253a. The projecting part 253c is a portion projecting inward in the radial direction of the sensor magnet 25 on the inter-pole part 253. Specifically, the projecting part 253c is a portion projecting toward the inside of the sensor magnet 25 (an inner diameter side of the sensor magnet 25) compared to both of the inner peripheral surface of the first magnetic-pole part 251 and the inner peripheral surface of the second magnetic-pole part 252 adjacent to each other.

In this embodiment, the width L3 is larger than both of the widths L1 and L2. The width L3 is preferably more than 1.5 times as large as the width L1. Similarly, the width L3 is preferably more than 1.5 times as large as the width L2. In this embodiment, the width L1 and the width L2 are equal, but may be different from each other.

The area of the detection target surface 253b of the inter-pole part 253 is larger than both of the area of the detection target surface 251b of the first magnetic-pole part 251 and the area of the detection target surface 252b of the second magnetic-pole part 252. The surface area of the detection target surface 253b of the inter-pole part 253 may be larger than the surface area of one of the detection target surfaces 251b and 252b.

Figure 8:
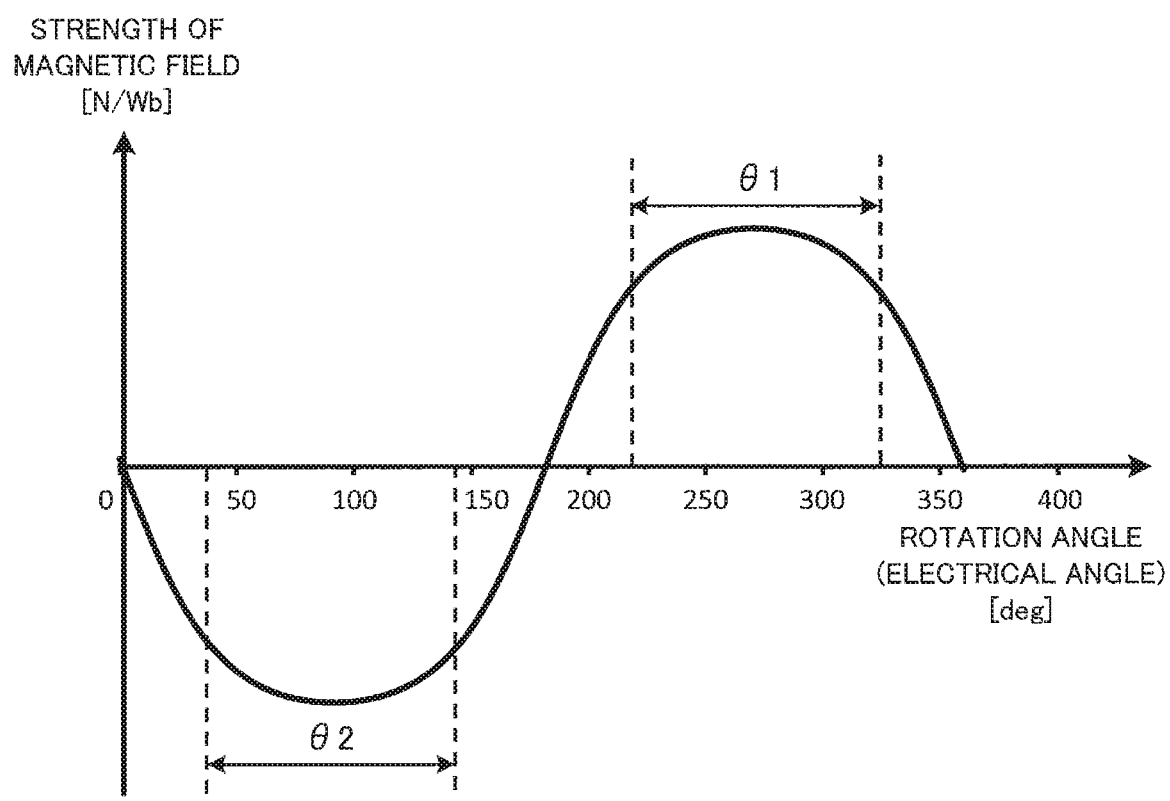
FIG. 8 is a diagram showing a relationship between a rotation angle (electrical angle) of the sensor magnet and strength of a magnetic field generated from the sensor magnet.

FIG. 8 is a diagram showing a relationship between a rotation angle (electrical angle θ) of the sensor magnet 25 and strength of a magnetic field generated from the sensor magnet 25 (strength of a magnetic field flowing into the magnetic sensor 5).

Figure 9:
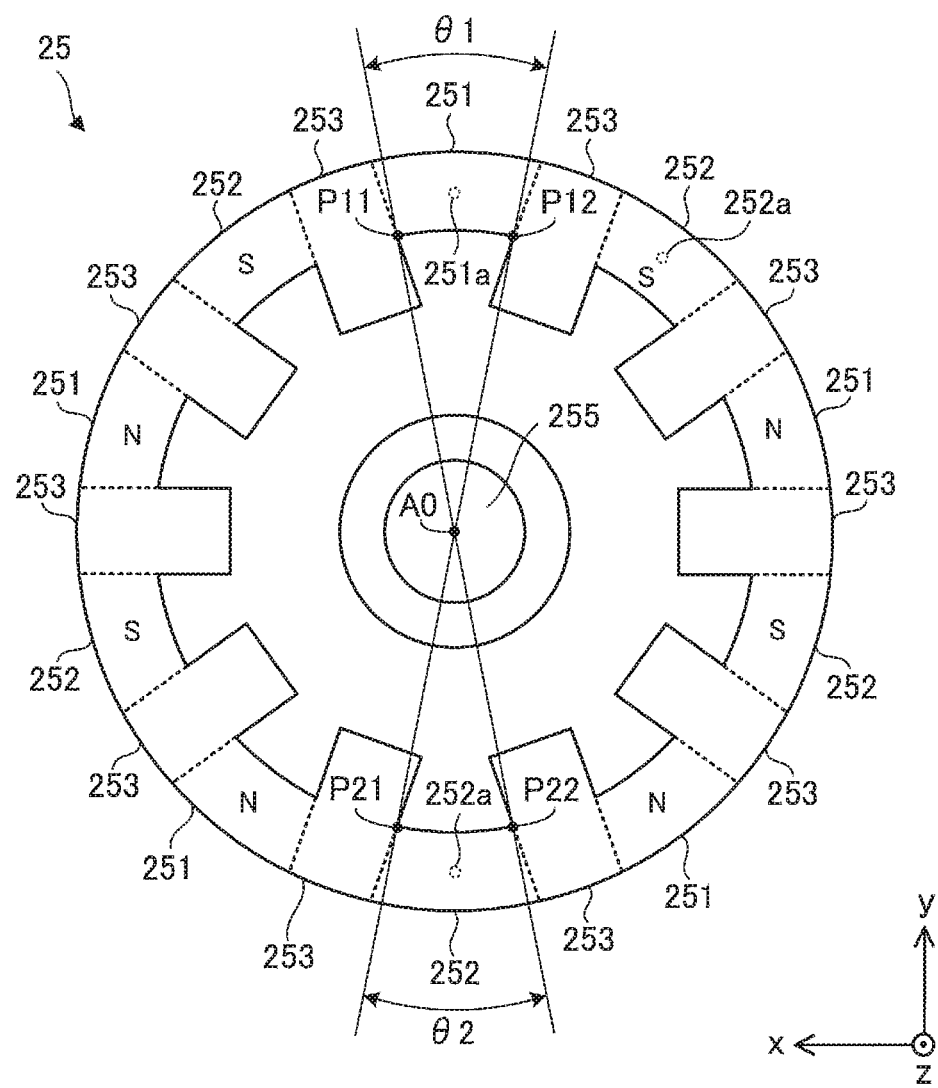
FIG. 9 is a diagram illustrating a central angle formed by both ends of an inner peripheral surface of a first magnetic-pole part and a central angle formed by both ends of an inner peripheral surface of a second magnetic-pole part.

FIG. 9 is a diagram illustrating a central angle θ1 formed by both ends (boundary positions P11 and P12) of the inner peripheral surface of each of the first magnetic-pole parts 251 and a central angle θ2 formed by both ends (boundary positions P21 and P22) of the inner peripheral surface of each of the second magnetic-pole parts 252.

To make the change in the magnetic field strength near the inter-pole portions 253a steep, it is necessary to obtain a sufficient width of the inter-pole parts 253 in the circumferential direction. As illustrated in FIG. 8, regions of high magnetic field strength in the sensor magnet 25 (the central angles θ1 and θ2) are preferably configured as the magnetic-pole parts (the first magnetic-pole part 251 and the second magnetic-pole part) and the other region is preferably configured as the inter-pole part 253.

Thus, as illustrated in FIG. 9, the central angle θ1 (electrical angle) formed by the inner periphery of each of the first magnetic-pole parts 251 between the boundary positions P11 and P12 in the circumferential direction around the axis line A0 preferably satisfies 0°<θ1<115°. The boundary positions P11 and P12 are boundary positions between the inner peripheral surface of each of the first magnetic-pole parts 251 and the inter-pole parts 253 at both sides of the first magnetic-pole part 251. In a case where the central angle θ1 is represented as a mechanical angle, in the sensor magnet 25 according to this embodiment in which the number of magnetic poles (the total number of the magnetic poles 251a and 252a) is ten, the central angle θ1 (mechanical angle) preferably satisfies 0°<θ1<23°.

Similarly, the central angle θ2 (electrical angle) formed by the inner periphery of each of the second magnetic-pole parts 252 between the boundary positions P21 and P22 in the circumferential direction around the axis line A0 preferably satisfies 0°<θ2<115°. The boundary positions P21 and P22 are boundary positions between the inner peripheral surface of each of the second magnetic-pole parts 252 and the inter-pole parts 253 at both sides of the second magnetic-pole part 252. In a case where the central angle θ2 is represented as a mechanical angle, in the sensor magnet 25 according to this embodiment in which the number of magnetic poles (the total number of the magnetic poles 251a and 252a) is ten, the central angle θ2 (mechanical angle) preferably satisfies 0°<θ2<23°.

Figure 10:
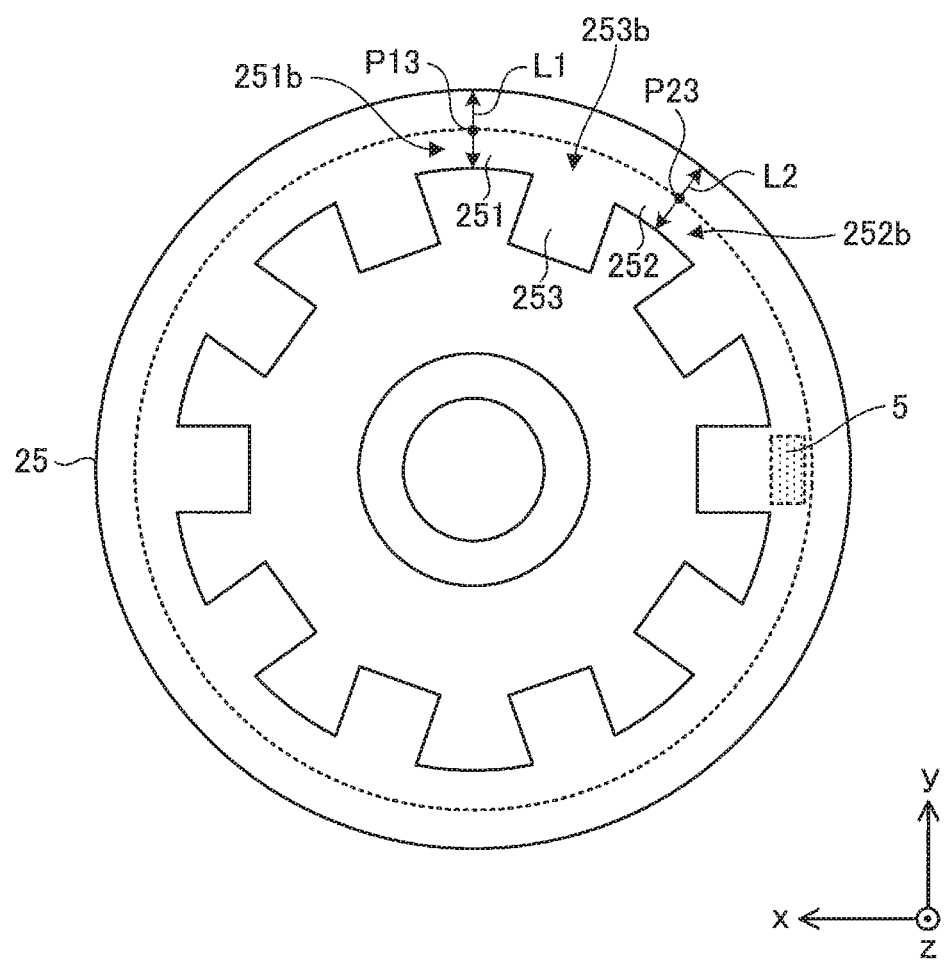
FIG. 10 is a diagram showing a positional relationship between the magnetic sensor and the sensor magnet.

FIG. 10 is a diagram showing a positional relationship between the magnetic sensor 5 and the sensor magnet 25.

In mounting the magnetic sensor 5 on the stator 3 (specifically the circuit board 4), the magnetic sensor 5 can be mounted at a position shifted from a predetermined position in some cases (mount error). In view of this, to reduce a detection error (the magnetic pole position detection error) caused by the mount error, the detection target surfaces 251b, 252b, and 253b are preferably located as close to the outside (an outer diameter side of the sensor magnet 25) as possible in a range where the input magnetic field from the sensor magnet 25 is strong. It should be noted that since the coil 32, teeth of the stator 3, or the like are disposed outside the sensor magnet 25, the sensor magnet 25 needs to be configured not to touch these components.

The magnetic sensor 5 is fixed to the stator 3 so as to face a region of the first magnetic-pole part 251 being inside a center position P13 of the width L1 and be away from the sensor magnet 25. In other words, the magnetic sensor 5 is disposed at a position facing a region of the sensor magnet 25 located inside a circle indicated by a broken line in FIG. 10. In addition, the magnetic sensor 5 is preferably fixed to the stator 3 so as to face a region of the second magnetic-pole part 252 being inside a center position P23 of the width L2 and be away from the sensor magnet 25. Furthermore, as illustrated in FIG. 10, the magnetic sensor 5 preferably faces a region where the detection target surfaces 251b, 252b, and 253b continue in the circumferential direction around the axis line A0.

First Variation

Figure 11:
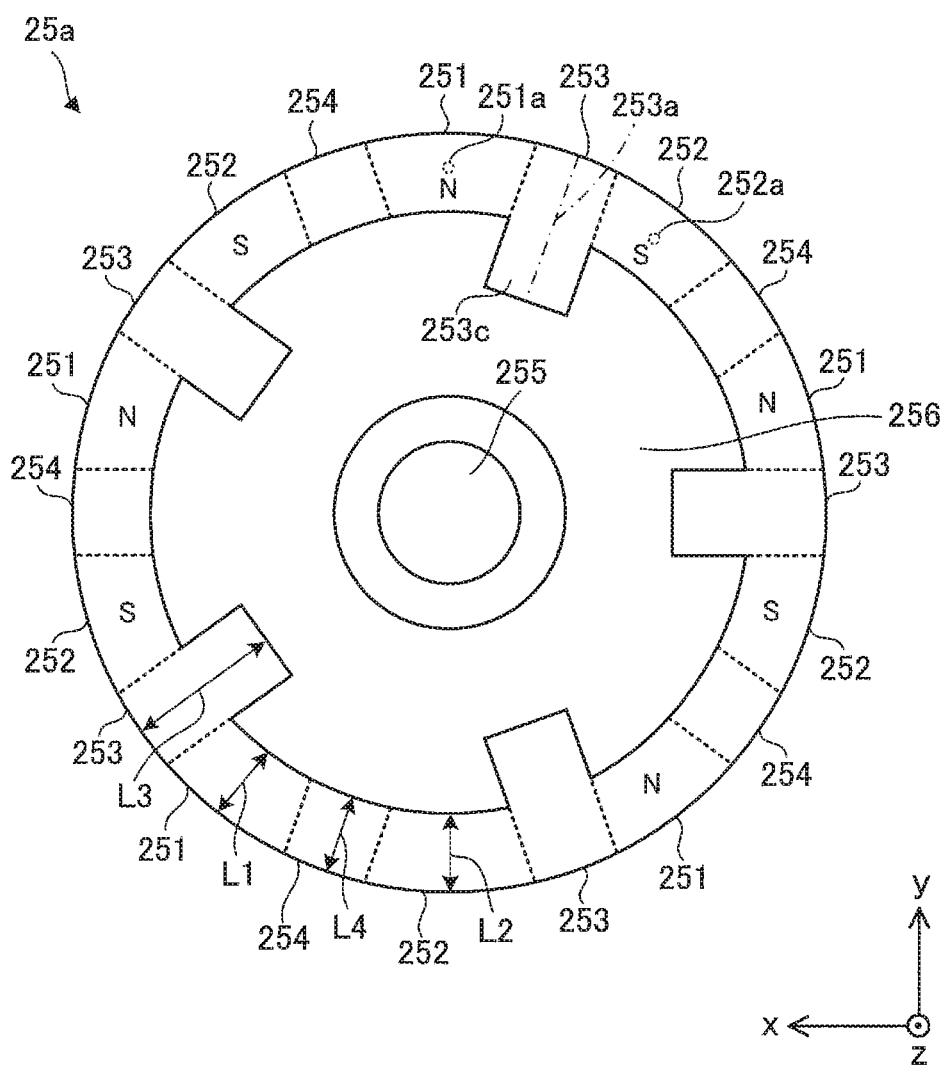
FIG. 11 is a plan view schematically illustrating a structure of a sensor magnet according to a first variation.
Figure 12:
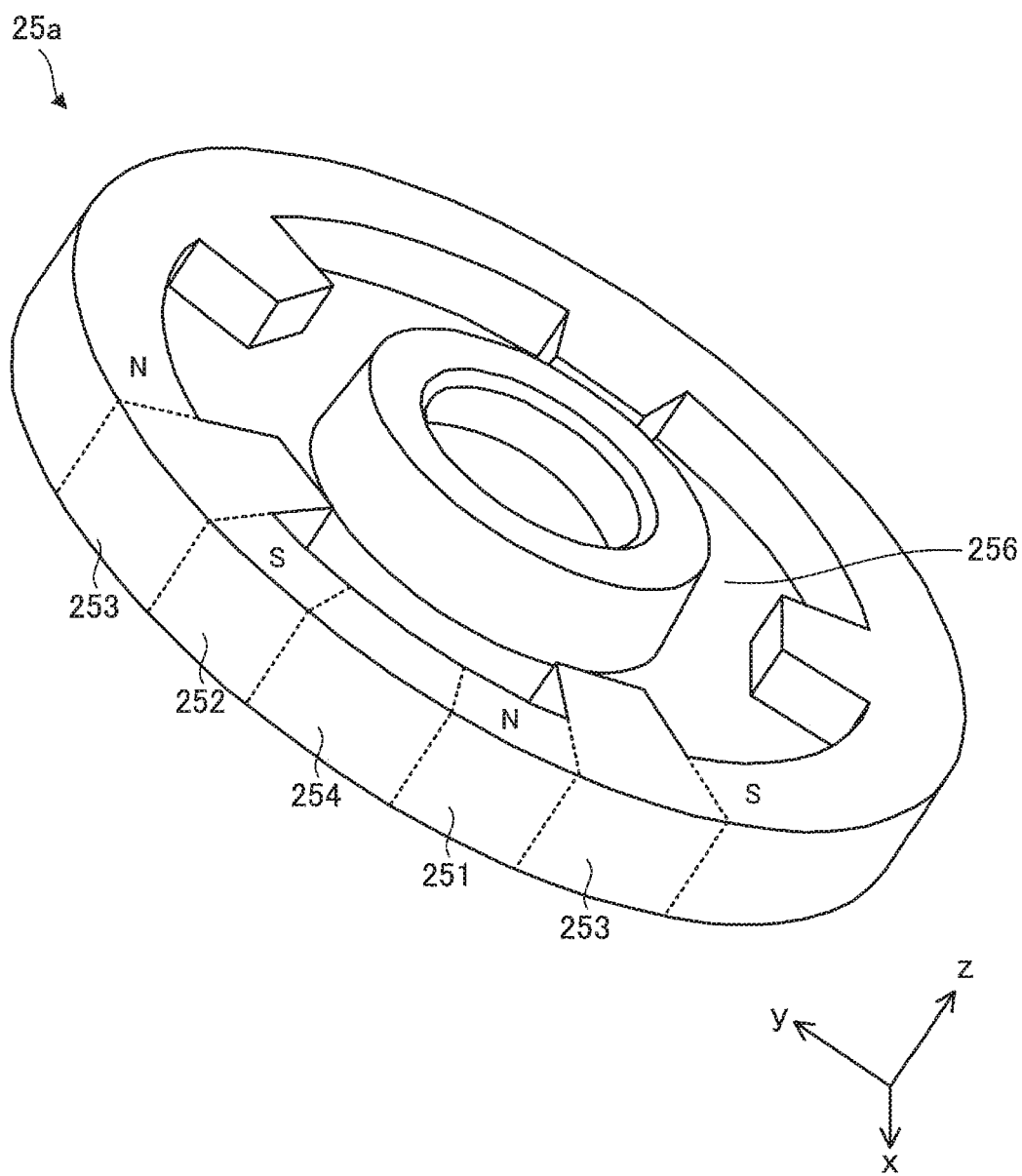
FIG. 12 is a perspective view schematically illustrating the structure of the sensor magnet according to the first variation.

FIG. 11 is a plan view schematically illustrating a structure of a sensor magnet 25a according to a first variation. FIG. 12 is a perspective view schematically illustrating the structure of the sensor magnet 25a.

The sensor magnet 25a according to the first variation is different from the sensor magnet 25 according to the first embodiment in including inter-pole parts 254 (second inter-pole parts) as adjacent parts having no projecting parts (e.g., portions corresponding to the projecting parts 253c of the inter-pole parts 253), and is the same as the sensor magnet 25 in the other respects.

The sensor magnet 25a includes a plurality of inter-pole parts (the inter-pole parts 253 and 254), and it is sufficient that at least one (one or more) of the plurality of inter-pole parts is the inter-pole part 253 having the projecting part 253c. Each of the inter-pole parts 254 as adjacent parts is adjacent to at least one of the magnetic-pole parts 251 or the magnetic-pole parts 252. That is, the inter-pole part 254 is disposed between one of the first magnetic-pole parts 251 and a corresponding one of the second magnetic-pole parts 252. In the sensor magnet 25a according to the first variation, the inter-pole parts 253 having the projecting parts 253c and the inter-pole parts 254 having no projecting parts are alternately arranged with the magnetic-pole parts (the first magnetic-pole parts 251 or the second magnetic-pole parts 252) interposed therebetween. As illustrated in FIG. 11, in a case where the sensor magnet 25a includes at least two first magnetic-pole parts 251 and at least two second magnetic-pole parts 252, the sensor magnet 25a preferably includes n (where n is an even number of four or more) magnetic poles and n/2 inter-pole parts 253. Similarly, in a case where the sensor magnet 25a includes at least two first magnetic-pole parts 251 and at least two second magnetic-pole parts 252, the sensor magnet 25a preferably includes n/2 inter-pole parts 254. Arrangement relationships among the first magnetic-pole parts 251, the inter-pole parts 253, and the second magnetic-pole parts 252 are preferably identical in the circumferential direction around the axis line A0.

In the sensor magnet 25a, the width L3 of the inter-pole parts 253 is larger than the width L4 of the inter-pole parts 254 in the radial direction of the sensor magnet in the inter-pole parts 254. In the sensor magnet 25a, the width L3 is larger than the widths L1 and L2. In addition, in the sensor magnet 25a, the widths L1, L2, and L4 are the same. It should be noted that the width L4 may be smaller than the widths L1 and L2.

Since the north poles (the magnetic poles 251a) and the south poles (the magnetic poles 252a) are periodically arranged in the circumferential direction in the sensor magnet 25a, the magnetic sensor 5 detects at least one (one or more) inter-pole portion 253a in the sensor magnet 25a, and thus the positions (phases) of the magnetic poles (the magnetic poles 251a and 252a) of the sensor magnet 25a (the main magnet 23) are detected.

Thus, if a change of a magnetic field can be made steep only at one inter-pole portion 253a, magnetic pole position detection errors can be reduced. However, to determine only the one point with the magnetic sensor and use the result for a magnetic pole position, complicated control is needed. In current control, all the inter-pole portions 253a regarding either points at which the change from the north pole to the south pole occurs or points at which the change from the south pole to the north pole occurs when the sensor magnet rotates are observed. In view of this, if changes of magnetic fields in all the inter-pole portions 253a used for control can be made steep, magnetic pole position detection errors can be reduced without complicated control.

Second Variation

Figure 13A:
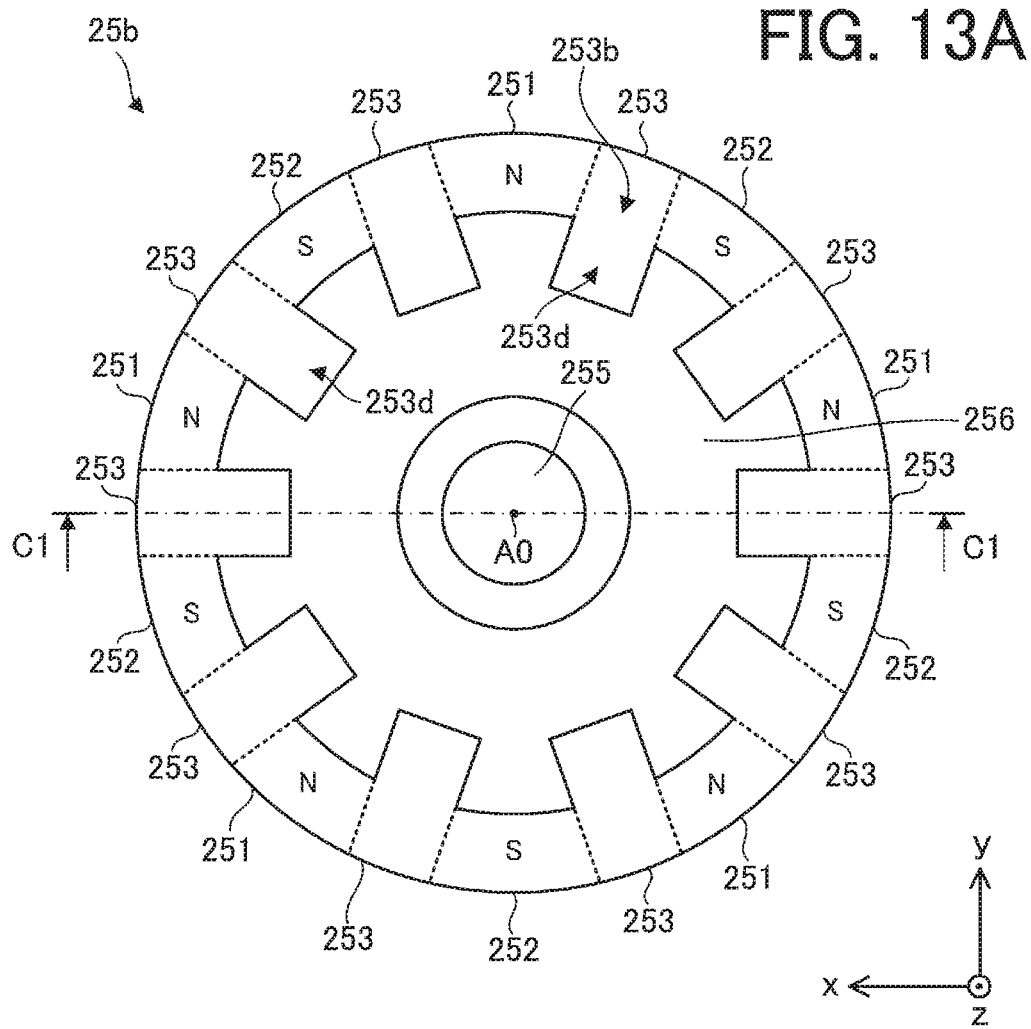
FIG. 13A is a plan view schematically illustrating a structure of a sensor magnet according to a second variation.
Figure 13B:
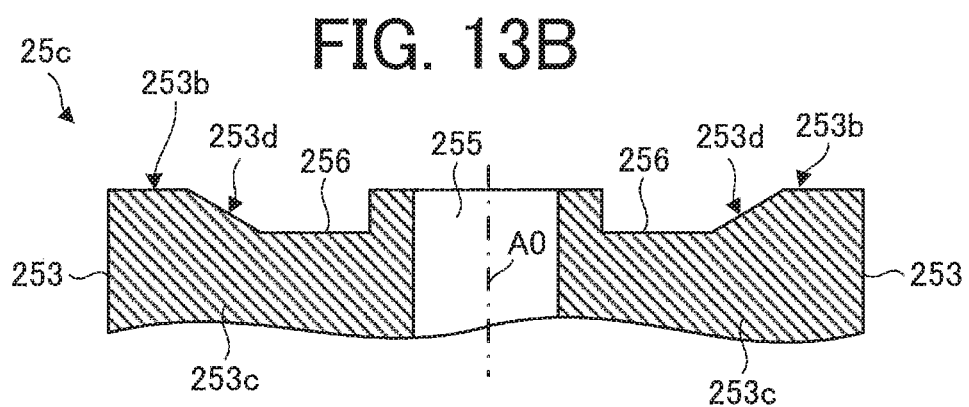
FIG. 13B is a cross-sectional view schematically illustrating a structure of the sensor magnet illustrated in FIG. 13A in a cross section taken along line C1-C1.

FIG. 13A is a plan view schematically illustrating a structure of a sensor magnet 25b according to a second variation. FIG. 13B is a cross-sectional view schematically illustrating a structure of the sensor magnet 25b illustrated in FIG. 13A in a cross section taken along line C1-C1.

The sensor magnet 25b according to the second variation is different from the sensor magnet 25 according to the first embodiment in that the detection target surfaces 253b of the inter-pole parts 253 include tilt portions 253d, but is the same as the sensor magnet 25 in the other respects.

In the sensor magnet 25b, the detection target surfaces 253b include the tilt portions 253d. The tilt portions 253d are portions that tilt from the outer peripheral side of the sensor magnet 25b toward the axis line A0. The tilt portions 253d are preferably formed on the detection target surfaces 253b of the projecting parts 253c.

Third Variation

Figure 14:
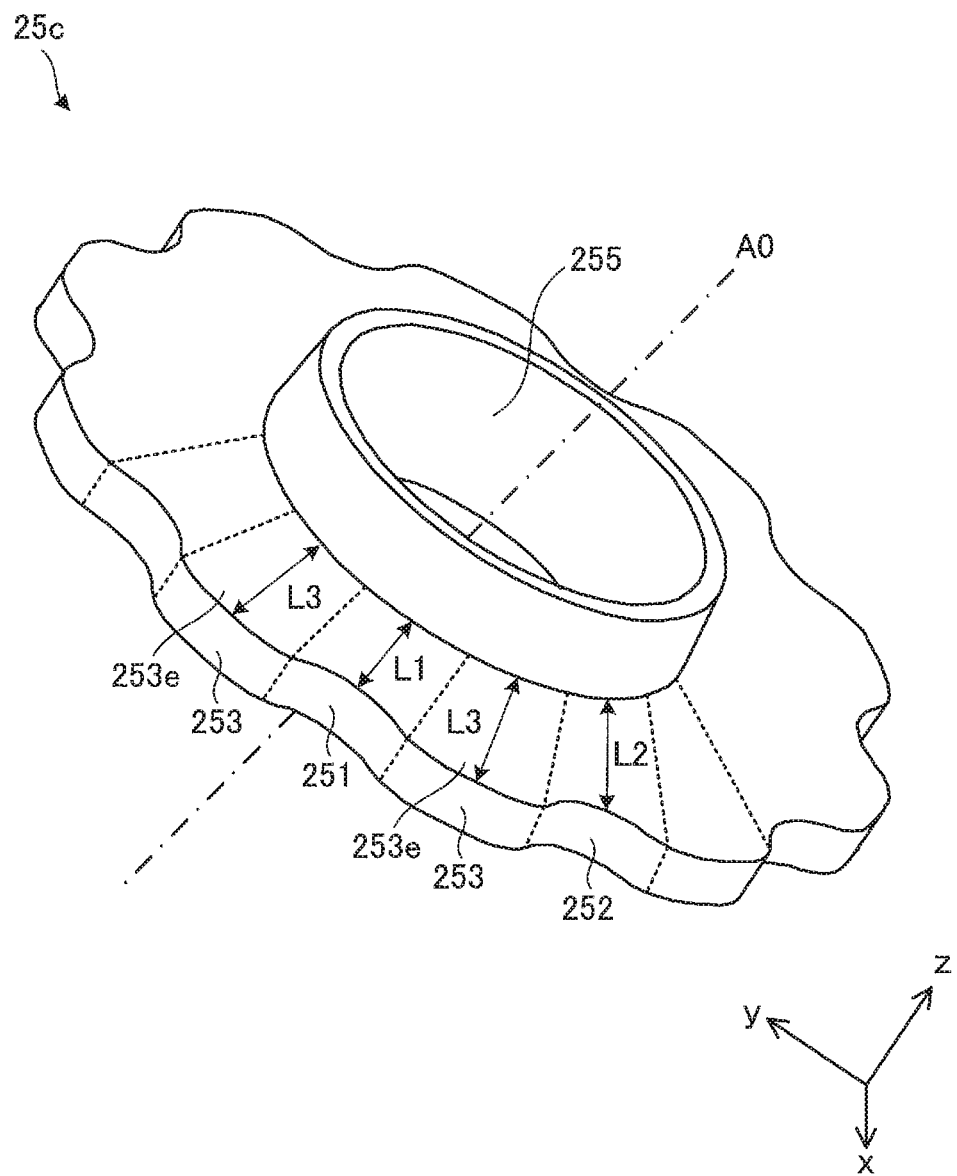
FIG. 14 is a perspective view schematically illustrating a structure of a sensor magnet according to a third variation.

FIG. 14 is a perspective view schematically illustrating a structure of a sensor magnet 25c according to a third variation.

In the sensor magnet 25c according to the third variation, the inter-pole parts 253 do not have projecting parts 253c (first projecting parts) and have projecting parts 253e (second projecting parts). The sensor magnet 25c does not have a depression 256. In these respects, the sensor magnet 25c according to the third variation is different from the sensor magnet 25 according to the first embodiment, and is the same as the sensor magnet 25 in the other respects. The projecting parts 253e are portions projecting outward in the radial direction of the sensor magnet 25 on the inter-pole parts 253.

Fourth Variation

Figures 15A, 15B:
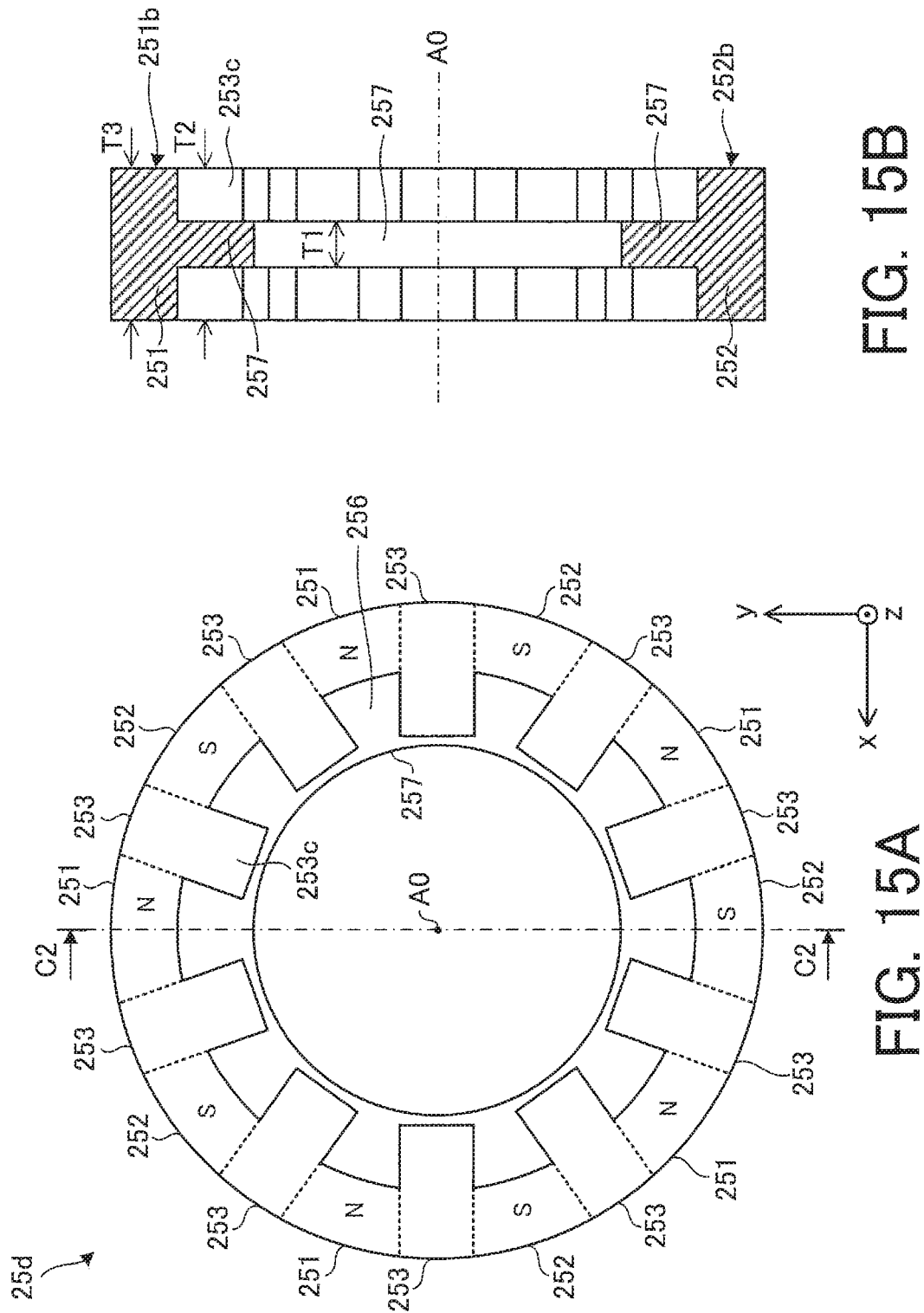
FIG. 15A is a plan view schematically illustrating a structure of a sensor magnet according to a fourth variation.
FIG. 15B is a cross-sectional view schematically illustrating a structure of the sensor magnet illustrated in FIG. 15A in a cross section taken along line C2-C2.

FIG. 15A is a plan view schematically illustrating a structure of a sensor magnet 25d according to a fourth variation. FIG. 15B is a cross-sectional view schematically illustrating a structure of the sensor magnet 25d illustrated in FIG. 15A in a cross section taken along line C2-C2.

Figure 16:
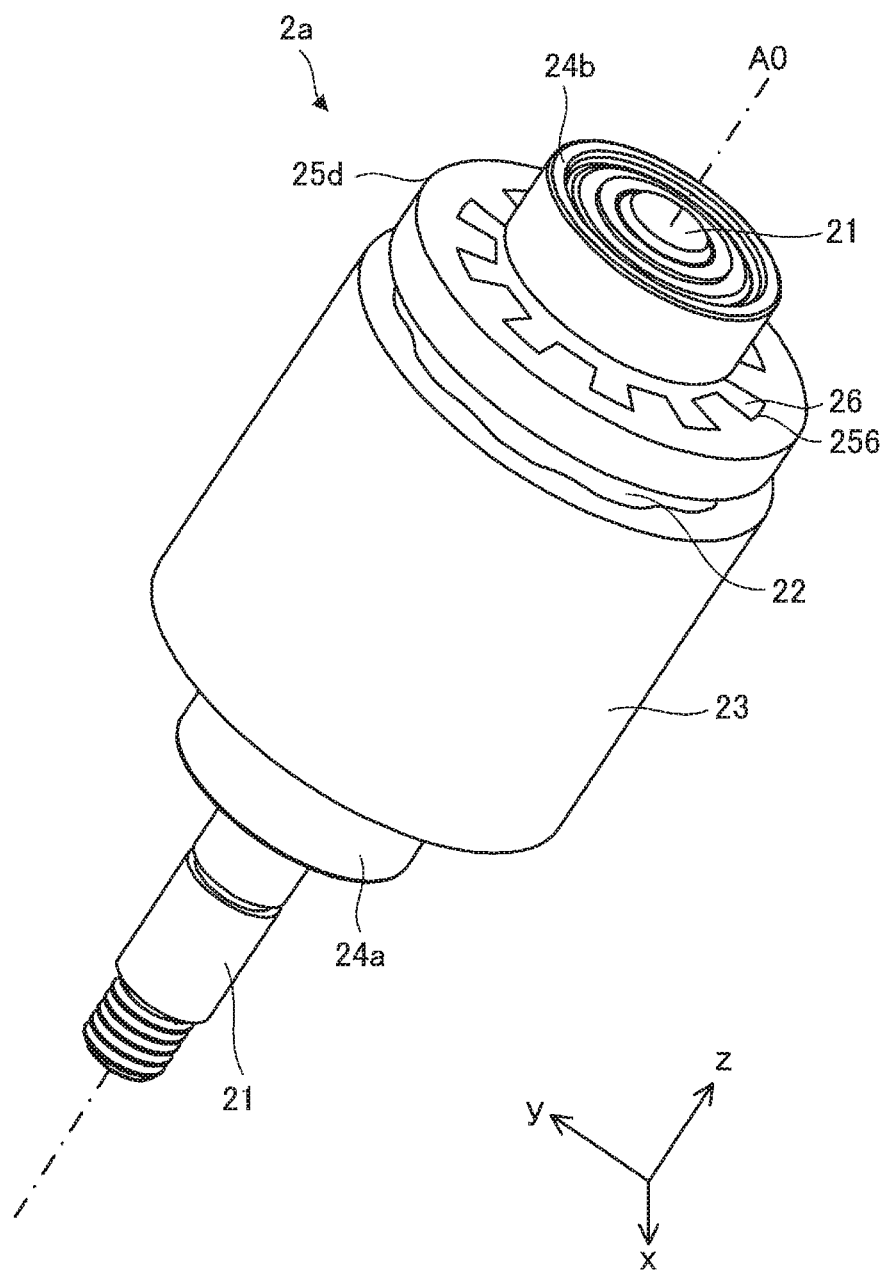
FIG. 16 is a perspective view schematically illustrating a structure of a rotor including the sensor magnet according to the fourth variation.

FIG. 16 is a perspective view schematically illustrating a structure of a rotor 2a including the sensor magnet 25d.

The sensor magnet 25d according to the fourth variation is different from the sensor magnet 25 according to the first embodiment in including a projecting part 257, and is the same as the sensor magnet 25 in the other respects. The rotor 2a includes the sensor magnet 25d instead of the sensor magnet 25. The rotor 2a is different from the rotor 2 described in the first embodiment in including a fixing member 26, and is the same as the rotor 2 in the other respects.

The sensor magnet 25d includes the projecting part 257 (third projecting part) projecting toward the rotation center (axis line A0), on an inner periphery side of the sensor magnet 25d. The projecting part 257 is closer to the main magnet 23 (−z side) in the axial direction than the detection target surfaces 251b and 252b. As illustrated in FIG. 15B, the thickness T1 of the projecting part 257 in a direction parallel to the axis line A0 is smaller than the thickness T2 of the projecting part 253c of the inter-pole part 253 in the direction parallel to the axis line A0. In addition, the thickness T1 of the projecting part 257 is smaller than the thickness T3 of the first magnetic-pole part 251 in the direction parallel to the axis line A0. In the fourth variation, the projecting part 257 is formed at the center position between the front surface and the back surface of the sensor magnet 25d, but may be formed at an end of the sensor magnet 25d toward the main magnet 23 (at the back surface side).

As illustrated in FIG. 16, the depression 256 of the sensor magnet 25d is provided with the fixing member 26 for fixing the sensor magnet 25d to the rotating shaft 21. The fixing member 26 is, for example, a resin formed by pouring the resin around the rotating shaft 21 and solidifying the resin. The projecting part 257 is preferably disposed between the fixing member 26 and the main magnet 23 (back yoke 22). For example, in the fourth variation, the fixing member 26 is disposed toward the magnetic sensor 5 (counter-load side) in the sensor magnet 25d (i.e., in the depression 256).

Fifth Variation

Figure 17:
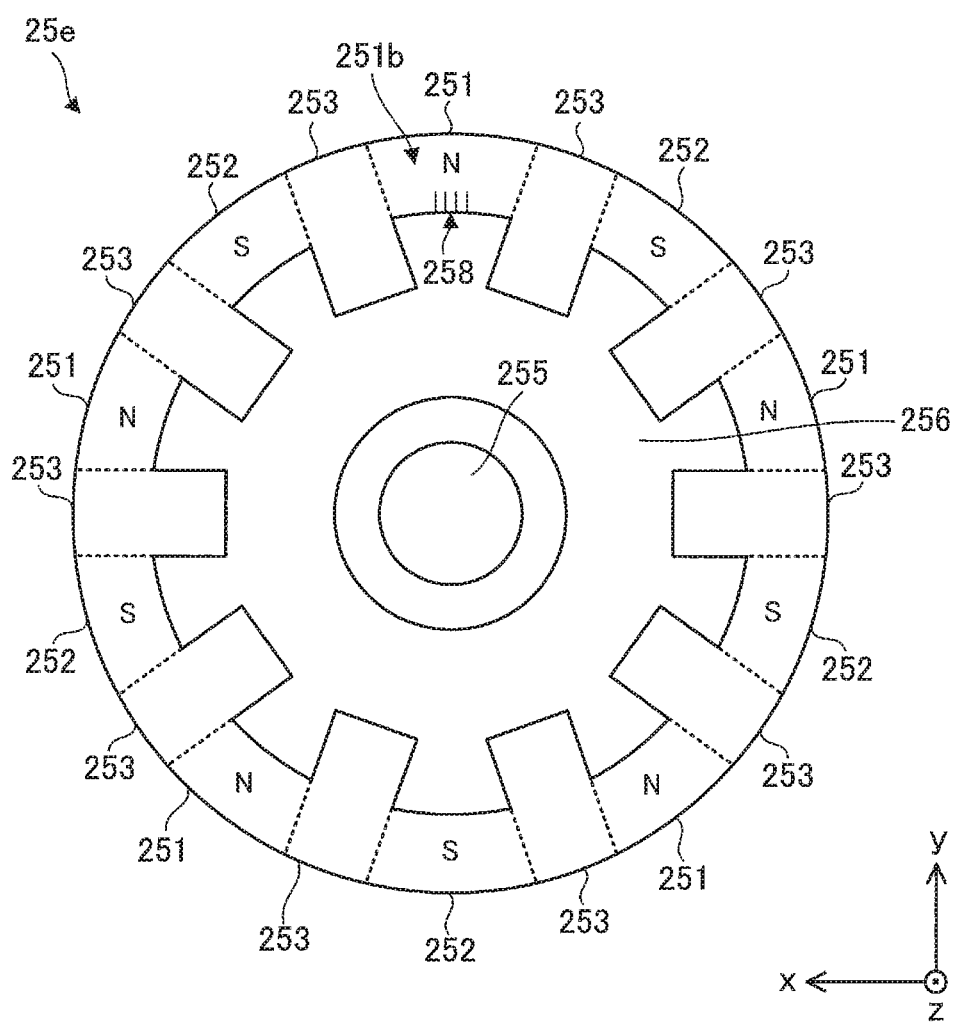
FIG. 17 is a plan view schematically illustrating a structure of a sensor magnet according to a fifth variation.

FIG. 17 is a plan view schematically illustrating a structure of a sensor magnet 25e according to a fifth variation.

The sensor magnet 25e according to the fifth variation is different from the sensor magnet 25 according to the first embodiment in including a mark 258, and is the same as the sensor magnet 25 in the other respects. The mark 258 indicates positions of the first magnetic-pole part 251 (the magnetic pole 251a), the second magnetic-pole part 252 (the magnetic pole 252a), and the inter-pole part 253 (the inter-pole portion 253a) in the sensor magnet 25e. The mark 258 is, for example, a marking-off line. As illustrated in FIG. 17, a marking is made with the mark 258 on a surface of the first magnetic-pole part 251 (the detection target surface 251b). It should be noted that marking with the mark 258 may be made on a portion except for the surface of the first magnetic-pole part 251 (e.g., on the surface of the second magnetic-pole part 252 or the surface of the inter-pole part 253).

Features of the first embodiment and features of the variations described above can be combined as appropriate. Features of the sensor magnets 25a through 25e according to the variations may be combined as appropriate to be applied to a sensor magnet mounted on the motor 1.

In the first embodiment, since the radial direction (e.g., the width L3) of the inter-pole parts 253 is larger than the radial width (e.g., the width L1) of the magnetic-pole parts (e.g., the first magnetic-pole parts 251), the strength of a magnetic field generated between the pole centers and the inter-pole portions 253a (the magnetic field strength near the inter-pole portions 253a) can be enhanced.

Advantages of the sensor magnet 25 according to the first embodiment will be specifically described with reference to the drawings.

Figure 18:
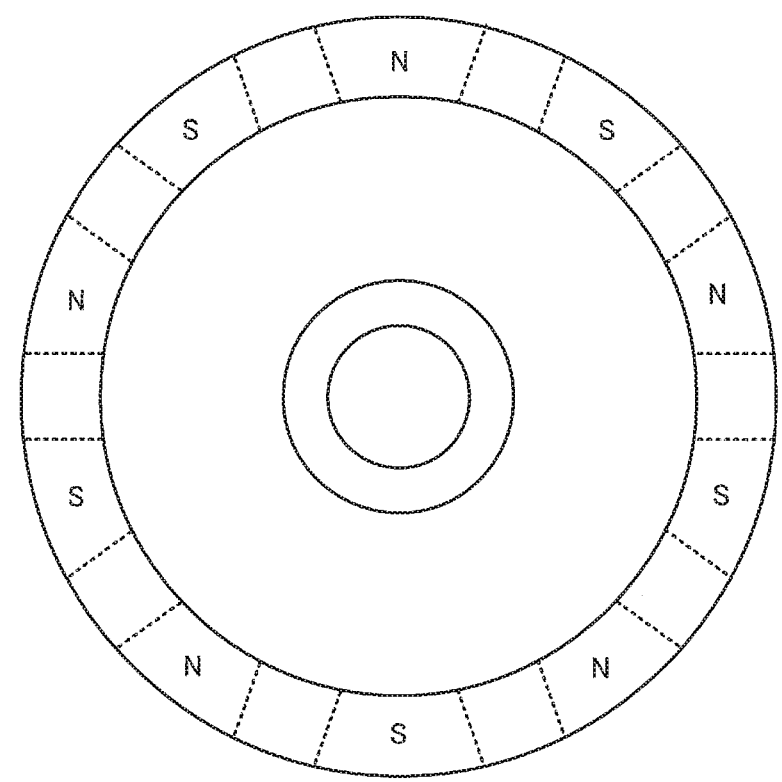
FIG. 18 is a plan view schematically illustrating a structure of a sensor magnet according to a comparative example.

FIG. 18 is a plan view schematically illustrating a structure of a sensor magnet 30 according to a comparative example. In the sensor magnet 30, the width of a detection target surface is uniform in the circumferential direction. Specifically, the radial width of inter-pole parts (corresponding to the inter-pole parts 253 of the sensor magnet 25) is equal to the radial width of magnetic-pole parts (corresponding to the first magnetic-pole parts 251 and the second magnetic-pole parts 252 of the sensor magnet 25).

Figure 19:
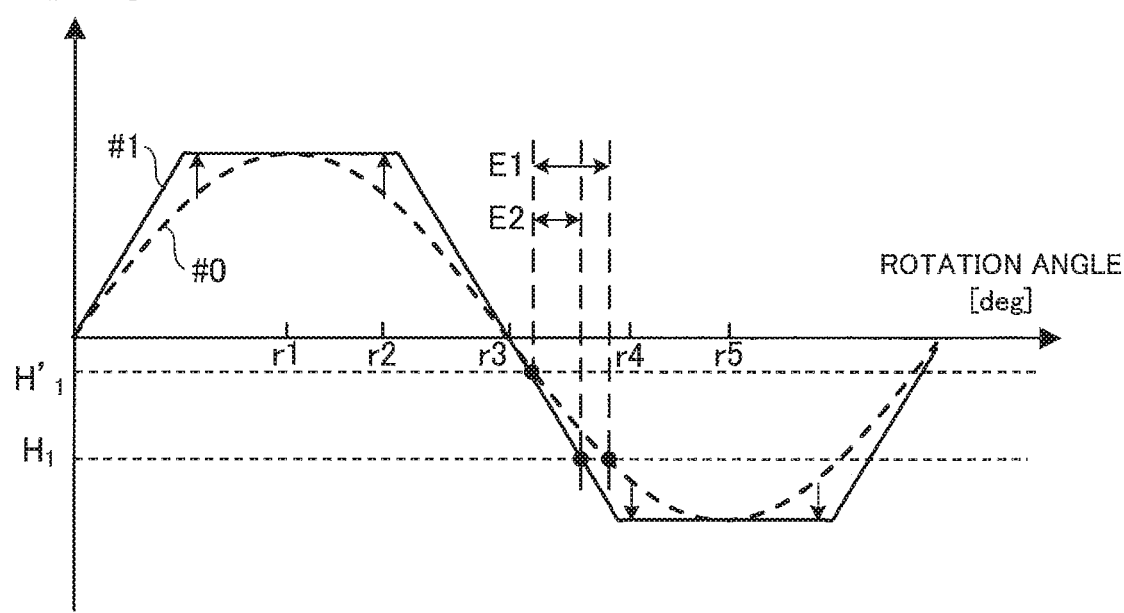
FIG. 19 is a diagram showing an example of a relationship between a rotation angle of a sensor magnet and magnetic field strength input to a magnetic sensor.

FIG. 19 is a diagram showing an example of a relationship between a rotation angle (phase) of the sensor magnet 25 (the main magnet 23) and magnetic field strength input to the magnetic sensor 5. In FIG. 19, the horizontal axis represents the rotation angle of the sensor magnet, and the vertical axis represents the magnetic field strength. In FIG. 19, #0 represents an example of a relationship between the rotation angle and the magnetic field strength of the sensor magnet 30 according to the comparative example, and #1 represents an example of a relationship between the rotation angle and the magnetic field strength of the sensor magnet 25 according to the first embodiment.

As shown in FIG. 19, in the sensor magnet 30 (#0), the magnetic field strength is at maximum near a magnetic pole (e.g., the north pole) at a rotation angle r1, the orientation of the magnetic field is reversed near an inter-pole at a rotation angle r3, and the magnetic field strength is at maximum again near a magnetic pole (e.g., the south pole) at a rotation angle r5. However, the time of switching of an output signal with respect to an input magnetic field (magnetic field strength) varies among some magnetic sensors 5. For example, the first magnetic sensor detects that the orientation of the magnetic field has reversed (the output signal is switched from $V_1$ to $V_2$) in a case where the input magnetic field strength is $H'_1$, and the second magnetic sensor detects that the orientation of the magnetic field has reversed (the output signal is switched from $V_1$ to $V_2$) in a case where the input magnetic field strength is $H_1$. In this case, a difference between the time of switching of the output signal of the first magnetic sensor and the time of switching of the output signal of the second magnetic sensor is E1.

As illustrated in FIG. 19, in the sensor magnet 25 (#1) according to the first embodiment, the magnetic field strength near the magnetic pole (e.g., the north pole) at the rotation angle r1 (e.g., the magnetic field strength at the rotation angle r2) is larger than the magnetic field strength of the sensor magnet 30 (#0). Similarly, the absolute value of the magnetic field strength near the magnetic pole (e.g., the south pole) at the rotation angle r5 (e.g., the magnetic field strength at the rotation angle r4) in the sensor magnet 25 (#1) is larger than the absolute value of the magnetic field strength in the sensor magnet 30 (#0). That is, in the sensor magnet 25 (#1) according to the first embodiment, the radial width (e.g., the width L3) of the inter-pole parts 253 is larger than the radial width (e.g., the width L1) of the magnetic-pole parts (e.g., the first magnetic-pole parts 251), and thus, the magnetic field strength between the pole center (rotation angle r1) and the inter-pole portion (rotation angle r3) (near the rotation angle r2) can be increased as compared to the sensor magnet 30 (#0) illustrated in FIG. 18. Thus, in the sensor magnet 25 (#1) according to the first embodiment, a change in the magnetic field strength in the inter-pole part 253 (near the rotation angle r3) can be made steep.

Similarly, in a case where the radial width (e.g., the width L3) of the inter-pole part 253 is larger than the radial width (e.g., the width L2) of the next magnetic-pole part (e.g., the second magnetic-pole part 252 at the rotation angle r5) of the magnetic-pole part at the rotation angle r1 (#1), the magnetic field strength (specifically the absolute value of the magnetic field strength) between the pole center (at the rotation angle r5) and the inter-pole portion (at the rotation angle r3) (near the rotation angle r4) can be enhanced. Accordingly, in the sensor magnet 25 (#1) according to the first embodiment, a change in the magnetic field strength in the inter-pole part 253 (near the rotation angle r4) can be made steep. In this case (#1), as shown in FIG. 19, a difference between the time of switching of the output signal of the first magnetic sensor and the time of switching of the output signal of the second magnetic sensor is E2. That is, an individual difference of detection accuracy of the magnetic sensor 5 in the case of using the sensor magnet 25 (#1) according to the first embodiment is smaller than an individual difference of detection accuracy of the magnetic sensor 5 in the case of using the sensor magnet 30 (#0) according to the comparative example.

Thus, the use of the magnetic sensor 5 together with the sensor magnet 25 according to the first embodiment can reduce the individual difference of accuracy of detection by the magnetic sensor 5 (e.g., accuracy of detection of the inter-pole portion or the magnetic pole position in the sensor magnet 25). As a result, a decrease of motor efficiency and noise during motor rotation caused by an error in motor control can be reduced.

In addition, in the sensor magnet 25 according to the first embodiment, the surface area of portions of the inter-pole parts 253 facing the magnetic sensor 5 (the detection target surfaces 253b) is larger than the surface area of portions of the first magnetic-pole parts 251 facing the magnetic sensor 5 (the detection target surfaces 251b). Thus, since the strength of a magnetic field generated from the sensor magnet 25 increases in proportion to the surface area (the area of a surface generating the magnetic field), the strength of a magnetic field generated between the pole center and the inter-pole portion 253a (magnetic field strength near the inter-pole portion 253a) can be increased. Accordingly, as described with reference to FIG. 19, a change in the magnetic field strength in the inter-pole parts 253 can be made steep, and thus, the individual difference of accuracy of detection by the magnetic sensor 5 can be reduced.

Since the radial width L3 of the inter-pole parts 253 is more than 1.5 times as large as the radial width L1 of the first magnetic-pole parts 251, the strength of a magnetic field generated between the pole center and the inter-pole portion 253a (magnetic field strength near the inter-pole portion 253a) can be further increased. Accordingly, as described with reference to FIG. 19, a change in the magnetic field strength in the inter-pole part 253 can be made steeper, and thus, the individual difference of accuracy of detection by the magnetic sensor 5 can be reduced.

Although the individual difference of accuracy of detection by the magnetic sensor 5 can be reduced by increasing the diameter of the sensor magnet 25, manufacturing costs and material costs increase with the increase in the diameter of the magnetic sensor 5. However, since the inter-pole parts 253 of the sensor magnet 25 according to the first embodiment include the projecting parts 253c projecting inward in the radial direction of the sensor magnet 25 on the inter-pole parts 253, the individual difference of accuracy of detection by the magnetic sensor 5 can be reduced at low costs.

Since the sensor magnet 25 is configured in such a manner that the central angle θ (electrical angle) formed by the first magnetic-pole parts 251 and the second magnetic-pole parts 252 with respect to the outer periphery satisfies 0°<θ<115°, a sufficient width in the circumferential direction of the inter-pole parts 253 can be obtained, the magnetic field strength between the pole center and the inter-pole portion 253a can be effectively enhanced, and a change in the magnetic field strength in the inter-pole parts 253 can be made steeper. Thus, the individual difference of accuracy of detection by the magnetic sensor 5 can be reduced.

In a case where the magnetic sensor 5 is disposed so as to face the outer diameter side of the sensor magnet 25 as close as possible, detection accuracy can be enhanced, but detection errors can arise in some cases under the influence of a magnetic field generated by the coil 32 of the stator 3. In the first embodiment, the magnetic sensor 5 is fixed to the stator 3 so as to face an inner portion of the center position of the radial width L1 in the radial direction of the first magnetic-pole parts 251, and thus, detection errors due to the influence of the magnetic field generated by the coil 32 of the stator 3 can be reduced, and accuracy of detection of the magnetic sensor 5 can be increased.

In addition, since the structure in which the outer periphery in the first magnetic-pole parts 251 (the second magnetic-pole parts 252) and the outer periphery in the inter-pole parts 253 are located on the same circle is employed, a range of a magnetic field that can be detected by the magnetic sensor 5 can be enlarged in the radial direction. Thus, the magnetic sensor 5 can be easily positioned (reduction of mount errors), and detection errors of the magnetic sensor 5 can be reduced.

In a case where the radial width L3 of all the inter-pole parts 253 is larger than the widths L1 and L2, positioning for matching the inter-pole portions 253a of the sensor magnet 25 with the inter-pole portions of the main magnet 23 can be easily performed.

The sensor magnets 25a through 25e according to the first through fifth variations can individually obtain the following advantages, in addition to the advantages of the sensor magnet 25 according to the first embodiment.

In the sensor magnet 25a according to the first variation, the inter-pole parts 253 having the projecting parts 253c and the inter-pole parts 254 having no projecting parts are alternately arranged with the magnetic-pole parts (the first magnetic-pole parts 251 or the second magnetic-pole parts 252) interposed therebetween. Since the width L3 of the inter-pole parts 253 is larger than the widths L1 and L2, a change in the magnetic field strength in the inter-pole parts 253 can be made steep with a simple configuration. Thus, an individual difference of accuracy of detection by the magnetic sensor 5 can be reduced.

Figure 20A:
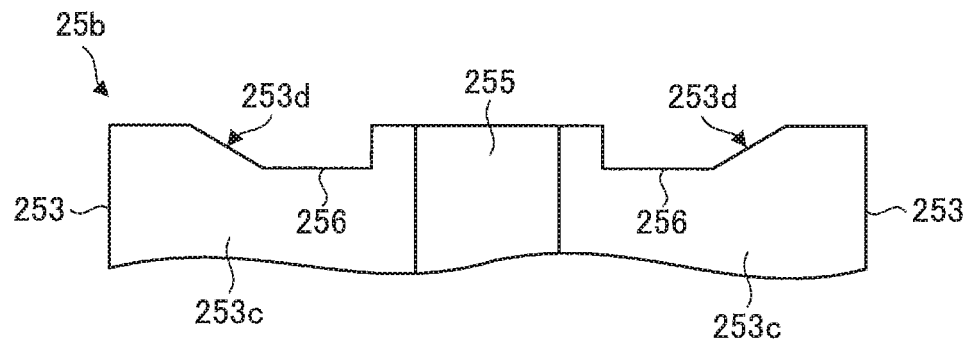
FIG. 20A is a cross-sectional view schematically illustrating the structure of the sensor magnet illustrated in FIG. 13A in a cross section taken along line C1-C1.
Figure 20B:
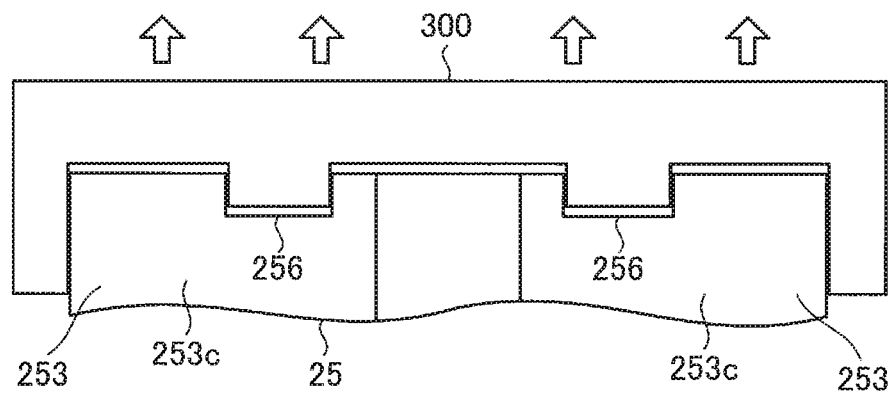
FIG. 20B is a diagram illustrating an operation of removing a mold from the sensor magnet according to the comparative example.
Figure 20C:
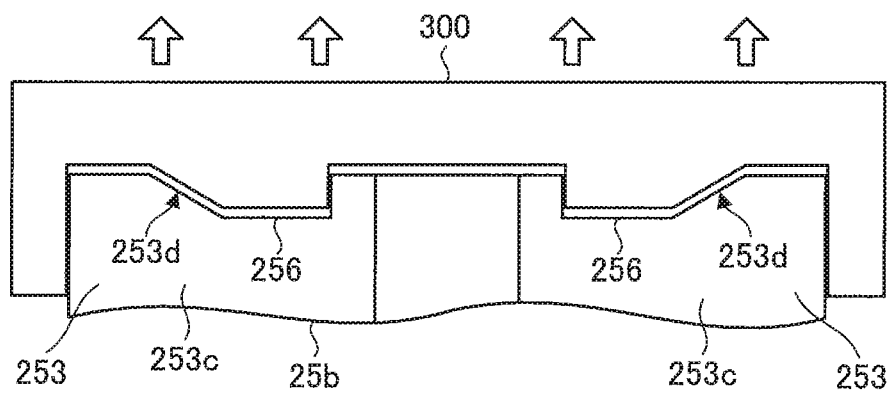
FIG. 20C is a diagram illustrating an operation of removing a mold from the sensor magnet according to the second variation.

FIG. 20A is a cross-sectional view (corresponding to FIG. 13B) schematically illustrating the structure of the sensor magnet 25b illustrated in FIG. 13A in a cross section taken along line C1-C1. FIG. 20B is a diagram illustrating an operation of removing a mold 300 from the sensor magnet 25 as a comparative example after molding of the sensor magnet 25 with the mold 300. FIG. 20C is a diagram illustrating an operation of removing the mold 300 from the sensor magnet 25b according to the second variation after molding of the sensor magnet 25b with the mold 300.

The sensor magnet 25b is molded by pouring a resin in the mold 300, for example. For example, as illustrated in FIG. 20B, in the sensor magnet 25 as the comparative example, since the inter-pole parts 253 do not include the tilt portions 253d, in removing the mold 300 from the sensor magnet 25, the mold 300 touches the side surfaces of the depression 256, and thus, the mold 300 is not easily removed from the sensor magnet 25 in some cases. On the other hand, as illustrated in FIG. 20C, in the sensor magnet 25b according to the second variation, the side surfaces of the depression 256 have the tilt portions 253d, and thus, the mold 300 can be easily removed from the sensor magnet 25b. In addition, since the tilt portions 253d are formed in the projecting parts 253c, the strength of the sensor magnet 25b (especially the inter-pole parts 253) can be enhanced, as compared to a structure in which the tilt portions 253d are formed outside the projecting parts 253c.

In the sensor magnet 25c according to the third variation, outer peripheral portions of the first magnetic-pole parts 251 and the second magnetic-pole parts 252 are subjected to, for example, a cutting process so that the projecting parts 253e can be formed. Thus, the sensor magnet 25c can be configured such that the width L3 is larger than both of the widths L1 and L2 with a simple process.

The sensor magnet 25d according to the fourth variation includes the projecting part 257 (third projecting part) projecting toward the rotation center (the axis line A0), on the inner periphery side of the sensor magnet 25d. As illustrated in FIG. 16, the depression 256 of the sensor magnet 25d is provided with the fixing member 26, and the sensor magnet 25d is fixed to the rotating shaft 21. In this case, since the projecting part 257 is in contact with the fixing member 26, it is possible to prevent the sensor magnet 25d from shifting toward the magnetic sensor 5 (in the +z direction) in the axial direction.

In addition, since the projecting part 257 is disposed substantially at the center between the front surface and the back surface of the sensor magnet 25d, the strength of the sensor magnet 25d (especially durability against a stress generated in a radially inner direction of the sensor magnet 25d) can be increased, as compared to a structure in which the projecting part 257 is formed on an end on the main magnet 23 side of the sensor magnet 25d (on the back surface side).

Furthermore, since the width L3 of the inter-pole parts 253 is larger than the width (e.g., the width L1) of the magnetic-pole parts (e.g., the first magnetic-pole parts 251), the projecting parts 253c of the inter-pole parts 253 that are in contact with the fixing member 26 can prevent the sensor magnet 25d from shifting with respect to the main magnet 23 in the circumferential direction.

The sensor magnet 25e according to the fifth variation includes the mark 258 indicating the position of the first magnetic-pole part 251 (the magnetic poles 251a), the second magnetic-pole part 252 (the magnetic poles 252a), and the inter-pole part 253 (the inter-pole portions 253a), and thus it makes positioning for attaching the sensor magnet 25e to the rotor 2 (specifically the main magnet 23) easy. For example, the inter-pole portion 253a of the sensor magnet 25e and the inter-pole portion of the main magnet 23 can be easily matched with visual observation.

In addition, in the first embodiment and the variations, the use of one of the sensor magnet 25 according to the first embodiment and the sensor magnets 25a through 25e according to the variations together with the magnetic sensor 5 in the rotors 2 and 2a can reduce an individual difference of accuracy of detection by the magnetic sensor 5 (e.g., accuracy of detection of the rotational position of the rotor 2).

Furthermore, in the first embodiment and the variations, the use of one of the sensor magnet 25 according to the first embodiment and the sensor magnets 25a through 25e according to the variations together with the magnetic sensor 5 in the motor 1 can reduce the individual difference of accuracy of detection by the magnetic sensor 5 (e.g., accuracy of detection of the rotational position of the rotor 2). As a result, a decrease of motor efficiency and noise during motor rotation caused by an error in motor control can be reduced.

Second Embodiment

Figure 21:
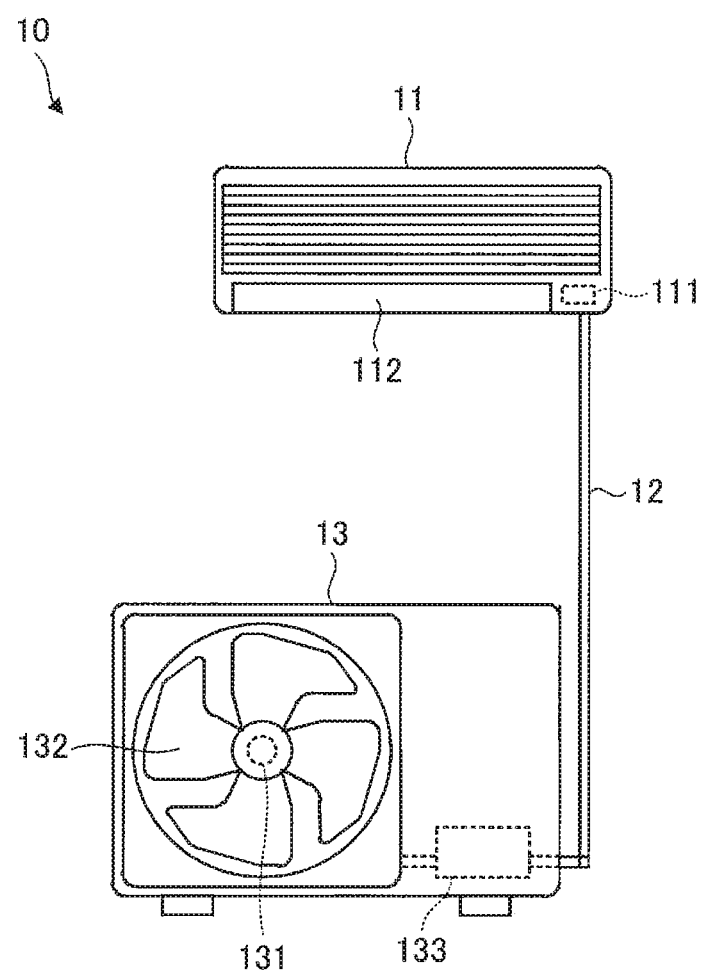
FIG. 21 is a diagram schematically illustrating a configuration of an air conditioner according to a second embodiment of the present invention.

FIG. 21 is a diagram schematically illustrating a configuration of an air conditioner 10 according to a second embodiment of the present invention.

An air conditioner 10 according to the second embodiment includes an indoor unit 11, a refrigerant pipe 12, and an outdoor unit 13 connected to the indoor unit 11 by the refrigerant pipe 12.

The indoor unit 11 includes a motor 111 and an air blower 112. The outdoor unit 13 includes a motor 131, a fan 132 serving as an air blower, and a heat exchanger 133.

In the air conditioner 10 according to the second embodiment, the motor 1 on which the sensor magnet 25 described in the first embodiment (including the variations thereof) is applied to at least one of the motors 111 and 131.

The air conditioner 10 can perform a cooling operation of sending cold air and a heating operation of sending warm air from the indoor unit 11, for example. In the indoor unit 11, the motor 111 is a driving source for driving the air blower 112. The air blower 112 can send conditioned air. In the outdoor unit 13, the motor 131 is a driving source for driving the fan 132. The fan 132 can send outdoor air to the heat exchanger 133.

Since the air conditioner according to the second embodiment includes the motor (at least one of the motors 111 and 131) including one of the sensor magnet 25 according to the first embodiment and the sensor magnets 25a through 25e according to the variations and the magnetic sensor 5, an individual difference of accuracy of detection by the magnetic sensor 5 can be reduced. As a result, a decrease in air conditioning efficiency of the air conditioner and noise of an air-conditioning operation caused by an error in motor control can be reduced.

What is claimed is:

1. A sensor magnet comprising:
   a first magnetic-pole part including a magnetic pole of first polarity;
   a second magnetic-pole part including a magnetic pole of second polarity; and
   an inter-pole part formed between the first magnetic-pole part and the second magnetic-pole part, wherein
   the first magnetic-pole part, the inter-pole part, and the second magnetic-pole part are arranged in a circumferential direction around an axis line,
   a width of the inter-pole part in a radial direction is larger than both of a width of the first magnetic-pole part in a radial direction and a width of the second magnetic-pole part in a radial direction and more than 1.5 times as large as the width of the first magnetic-pole part, and
   an area of a detection target surface of the inter-pole part in an axial direction parallel to the axis line is larger than both of an area of a detection target surface of the first magnetic-pole part in the axial direction and an area of a detection target surface of the second magnetic-pole part in the axial direction.

2. The sensor magnet according to claim 1, wherein a depression is formed inside the inter-pole part in the radial direction.

3. The sensor magnet according to claim 1, wherein the inter-pole part includes a first projecting part projecting inward in the radial direction on the inter-pole part.

4. The sensor magnet according to claim 3, further comprising a third projecting part projecting toward the axis line, on an inner periphery side of the sensor magnet, wherein
a thickness of the third projecting part is smaller than a thickness of the first projecting part.

5. The sensor magnet according to claim 1, wherein the inter-pole part includes a second projecting part projecting outward in the radial direction on the inter-pole part.

6. The sensor magnet according to claim 1, wherein an electrical angle θ formed by an inner periphery of each of the first magnetic-pole part and the second magnetic-pole part around the axis line in the circumferential direction satisfies 0°<θ<115°.

7. The sensor magnet according to claim 1, wherein the inter-pole part includes a tilt portion that tilts from an outer peripheral side of the sensor magnet toward the axis line.

8. The sensor magnet according to claim 1, further comprising a mark indicating positions of the first magnetic-pole part, the inter-pole part, and the second magnetic-pole part.

9. The sensor magnet according to claim 1, further comprising an adjacent part between the first magnetic-pole part and the second magnetic-pole part.

10. A sensor magnet including n magnetic poles where n is an even number of four or more, the sensor magnet comprising:
at least two first magnetic-pole parts each including a magnetic pole of first polarity;
at least two second magnetic-pole parts each including a magnetic pole of second polarity; and
n/2 inter-pole parts, wherein
the first magnetic-pole parts and the second magnetic-pole parts are alternately arranged in a circumferential direction around an axis line,
each of the inter-pole parts is formed between one of the first magnetic-pole parts and one of the second magnetic-pole parts,
arrangement relationships among the first magnetic-pole parts, the inter-pole parts, and the second magnetic-pole parts are identical in the circumferential direction,
a width of each of the inter-pole parts in a radial direction is larger than both of a width of each of the first magnetic-pole parts in a radial direction and a width of each of the second magnetic-pole parts in a radial direction, and
an area of a detection target surface of each of the inter-pole parts in an axial direction parallel to the axis line is larger than both of an area of a detection target surface of each of the first magnetic-pole parts in the axial direction and an area of a detection target surface of each of the second magnetic-pole parts in the axial direction.

11. A rotor comprising:
a rotating shaft;
a rotor yoke fixed to the rotating shaft; and
a sensor magnet, wherein
the sensor magnet includes:
a first magnetic-pole part including a magnetic pole of first polarity;
a second magnetic-pole part including a magnetic pole of second polarity; and
an inter-pole part formed between the first magnetic-pole part and the second magnetic-pole part, wherein
the first magnetic-pole part, the inter-pole part, and the second magnetic-pole part are arranged in a circumferential direction around an axis line,
a width of the inter-pole part in a radial direction is larger than both of a width of the first magnetic-pole part in a radial direction and a width of the second magnetic-pole part in a radial direction and more than 1.5 times as large as the width of the first magnetic-pole part, and
an area of a detection target surface of the inter-pole part in an axial direction parallel to the axis line is larger than both of an area of a detection target surface of the first magnetic-pole part in the axial direction and an area of a detection target surface of the second magnetic-pole part in the axial direction.

12. An electric motor comprising:
a stator;
a rotor disposed inside the stator; and
a magnetic sensor to detect a rotational position of the rotor, wherein
the rotor includes:
a rotating shaft;
a rotor yoke fixed to the rotating shaft; and
a sensor magnet disposed at a position facing the magnetic sensor, and
the sensor magnet includes:
a first magnetic-pole part including a magnetic pole of first polarity;
a second magnetic-pole part including a magnetic pole of second polarity; and
an inter-pole part formed between the first magnetic-pole part and the second magnetic-pole part, wherein
the first magnetic-pole part, the inter-pole part, and the second magnetic-pole part are arranged in a circumferential direction around an axis line,
a width of the inter-pole part in a radial direction is larger than both of a width of the first magnetic-pole part in a radial direction and a width of the second magnetic-pole part in a radial direction and more than 1.5 times as large as the width of the first magnetic-pole part, and
an area of a detection target surface of the inter-pole part in an axial direction parallel to the axis line is larger than both of an area of a detection target surface of the first magnetic-pole part in the axial direction and an area of a detection target surface of the second magnetic-pole part in the axial direction.

13. The electric motor according to claim 12, wherein the magnetic sensor is fixed to the stator so as to face a region of the first magnetic-pole part being inside a center position of the width of the first magnetic-pole part and be away from the sensor magnet.

14. An air conditioner comprising:
an outdoor unit;
an indoor unit connected to the outdoor unit; and
an electric motor mounted on at least one of the outdoor unit and the indoor unit, wherein
the electric motor includes:
a stator;
a rotor disposed inside the stator; and
a magnetic sensor to detect a rotational position of the rotor,
the rotor includes:
a rotating shaft;
a rotor yoke fixed to the rotating shaft; and
a sensor magnet disposed at a position facing the magnetic sensor,
the sensor magnet includes:

a first magnetic-pole part including a magnetic pole of first polarity;
a second magnetic-pole part including a magnetic pole of second polarity; and
an inter-pole part formed between the first magnetic-pole part and the second magnetic-pole part, wherein
the first magnetic-pole part, the inter-pole part, and the second magnetic-pole part are arranged in a circumferential direction around an axis line,
a width of the inter-pole part in a radial direction is larger than both of a width of the first magnetic-pole part in a radial direction and a width of the second magnetic-pole part in a radial direction and more than 1.5 times as large as the width of the first magnetic-pole part, and
an area of a detection target surface of the inter-pole part in an axial direction parallel to the axis line is larger than both of an area of a detection target surface of the first magnetic-pole part in the axial direction and an area of a detection target surface of the second magnetic-pole part in the axial direction.

* * * * *